United States Patent

Shiraki

(10) Patent No.: US 10,063,478 B2
(45) Date of Patent: Aug. 28, 2018

(54) SWITCHING DEVICE AND CONTROL METHOD OF SWITCHING DEVICE

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 15/209,804

(22) Filed: Jul. 14, 2016

(65) Prior Publication Data

US 2017/0048145 A1 Feb. 16, 2017

(30) Foreign Application Priority Data

Aug. 10, 2015 (JP) ................................. 2015-158378

(51) Int. Cl.
- *H04L 12/803* (2013.01)
- *H04L 12/863* (2013.01)
- *H04L 12/873* (2013.01)
- *H04L 12/911* (2013.01)

(52) U.S. Cl.
CPC ............ *H04L 47/122* (2013.01); *H04L 47/52* (2013.01); *H04L 47/6215* (2013.01); *H04L 47/6225* (2013.01); *H04L 47/6295* (2013.01); *H04L 47/828* (2013.01)

(58) Field of Classification Search
CPC ..... H04L 47/52; H04L 47/122; H04L 47/828; H04L 47/6215; H04L 47/6225; H04L 47/6295
See application file for complete search history.

(56) References Cited

U.S. PATENT DOCUMENTS

| | | | | |
|---|---|---|---|---|
| 6,188,698 B1* | 2/2001 | Galand | ............... | H04L 47/10 370/229 |
| 6,977,940 B1* | 12/2005 | Ahlfors | ............... | H04L 12/5601 370/412 |
| 7,020,712 B1* | 3/2006 | Chin | ............... | H04L 47/6215 709/234 |
| 7,385,986 B2* | 6/2008 | Ono | ............... | H04L 29/06 370/395.4 |
| 8,867,560 B2* | 10/2014 | Kumar | ............... | H04L 47/22 370/235 |
| 9,807,027 B2* | 10/2017 | Shumsky | ............... | H04L 47/624 |
| 2002/0097733 A1* | 7/2002 | Yamamoto | ............... | H04L 45/00 370/412 |
| 2004/0081177 A1* | 4/2004 | Henderickx | ............... | H04L 47/10 370/401 |
| 2005/0175014 A1* | 8/2005 | Patrick | ............... | H04L 47/10 370/395.43 |

(Continued)

*Primary Examiner* — Steven H D Nguyen
(74) *Attorney, Agent, or Firm* — Fujitsu Patent Center

(57) ABSTRACT

A plurality of internal queues that receives and stores therein packets and that outputs each of the stored packets is included. Then, a transmission side meter counter and a reception side meter counter acquire transmission/reception information on the packets that are stored in each of the internal queues. A control unit creates, on the basis of the transmission/reception information, flow groups to each of which one or a plurality of flows belongs and allocates the internal queues to the flow groups. A scheduler determines, on the basis of the transmission/reception information and previously determined priority of the internal queues, the order in which each of the internal queues is output.

6 Claims, 13 Drawing Sheets

(56) References Cited

U.S. PATENT DOCUMENTS

| | | | |
|---|---|---|---|
| 2006/0104299 A1* | 5/2006 | Vazquez Castro | ............................ H04B 7/18582 370/412 |
| 2007/0036168 A1* | 2/2007 | Hsiao | ................... H04L 47/2441 370/412 |
| 2008/0080382 A1* | 4/2008 | Dahshan | ............... H04L 45/302 370/235 |
| 2012/0275301 A1* | 11/2012 | Xiong | .................... H04L 49/357 370/230 |
| 2015/0277613 A1* | 10/2015 | Roberts | ................... G06F 3/042 345/175 |
| 2017/0048145 A1* | 2/2017 | Shiraki | ................. H04L 47/122 |
| 2017/0093739 A1* | 3/2017 | Kitada | ................ H04L 47/2441 |

* cited by examiner

FIG.2

| FLOW | FLOW ID |
|---|---|
| SIP=S1, DIP=D1, SP=JP1, DP=Q1, Prot=A1 | F1 |
| SIP=S2, DIP=D2, SP=JP2, DP=Q2, Prot=A2 | F2 |
| SIP=S3, DIP=D3, SP=JP3, DP=Q3, Prot=A3 | F3 |

FIG.3

| FLOW ID | FLOW GROUP |
|---|---|
| F1 | FG1 |
| F2 | FG1 |
| F3 | FG2 |

FIG.4

| FLOW ID | CONSTRAINT INFORMATION |
|---------|------------------------|
| F1 | BW=1Gpbs |
| F2 | BW=3Gpbs |
| F3 | BW=2Gpbs |

FIG.5

| QUEUE NUMBER | PRIORITY | WEIGHT | AVERAGE PACKET LENGTH | COUNTER |
|--------------|----------|--------|------------------------|---------|
| #1 | P1 | W1 | L1 | C1 |
| #2 | P2 | W2 | L2 | C2 |
| ⋮ | ⋮ | ⋮ | ⋮ | ⋮ |
| #N | PN | WN | LN | CN |

FIG.8

| STATISTICAL VALUE | WEIGHT SETTING |
|---|---|
| TP<SET BW | ADDITION |
| TP>SET BW | SUBTRACTION |
| DROP>DROP THRESHOLD | ADDITION |
| DROP<DROP THRESHOLD | SUBTRACTION |
| QLEN>QLEN THRESHOLD | ADDITION |
| QLEN<QLEN THRESHOLD | SUBTRACTION |

FIG.11

| R | NEXT (R) |
|---|---|
| 4'b0001 | 4'b1110 |
| 4'b0010 | 4'b1100 |
| 4'b0100 | 4'b1000 |
| 4'b1000 | 4'b0000 |
| Others | 4'b1111 |

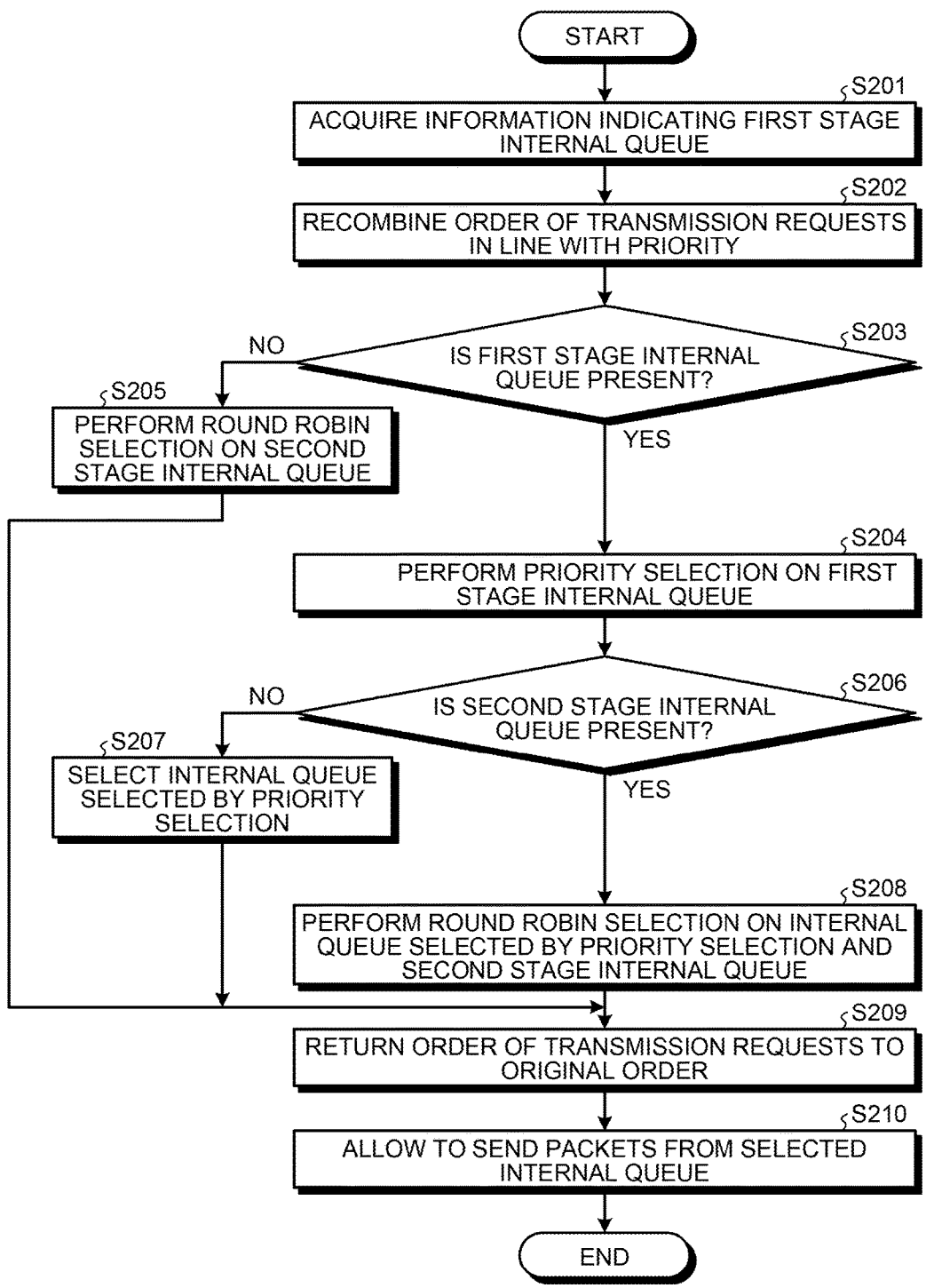

SWITCHING DEVICE AND CONTROL METHOD OF SWITCHING DEVICE

CROSS-REFERENCE TO RELATED APPLICATION

This application is based upon and claims the benefit of priority of the prior Japanese Patent Application No. 2015-158378, filed on Aug. 10, 2015, the entire contents of which are incorporated herein by reference.

FIELD

The embodiments discussed herein are directed to a switching device and a control method of the switching device.

BACKGROUND

In recent years, with the aim of reducing a cost and improving flexibility of a system, cloud computing has been widely used. As a technology for building a cloud computing platform thereof, Infrastructure as a Service (IaaS) has been proposed. IaaS is a technology that provides infrastructure, such as equipment, networks, or the like including virtual servers needed to operate external information systems, such as network environments, as services on the Internet.

IaaS provides information infrastructure to users via the Internet. Furthermore, in IaaS, network resources are often supplied to a plurality of users. Because of this, in data centers that implement IaaS or the like, the communication quality needs to be improved. Specifically, in IaaS, the high communication performance, such as a high band width or a low latency, and fairly sharing network resources, such as fair band allocation and low jitter, i.e., a reduction in fluctuations in latency, are needed.

In order to respond to these demands, to improve the communication quality, control of allocating current virtual machines (VM) and band control in virtual switches are performed. However, on calculation, even if VMs are appropriately disposed, there may be a case in which congestion or the like occurs depending on the actual operational state. Consequently, due to exhaustion of buffer resources or capacity limit of the switching performance, a decrease in the communication performance and an unfair share state of the network resources may possibly occur. In order to cope with such states, it is conceivable to dispose VMs by allowing each of the VMs to have, for example, a sufficient band; however, the use efficiency of the resources is decreased and thus a cost may possibly be increased.

Thus, it is preferable to perform, when, for example, congestion occurs, scheduling in accordance with the policy that is used to implement a fair state. The fair mentioned here indicates that all of the flows are fairly treated. The flow mentioned here indicates a series of packets that are classified by a condition that includes the addresses of the transmission source and the transmission destination, a port number, or a protocol number.

Thus, conventionally, a technology of switching paths in order to avoid congestion has been proposed. Furthermore, a technology that controls, by using a plurality of transmission queues, bands in accordance with the scheduling of the transmission queues has been proposed.

Patent Document 1: U.S. Pat. No. 8,867,560

However, if the path are switched at the midpoint of the flow, the reception order of packets may possibly be changed. Furthermore, in the technology that controls the bands in accordance with the scheduling of the plurality of transmission queues, there is a problem as follows. For example, it is difficult to allocate dedicated queues to all of the flows because the number of queues is limited. In addition, it is difficult to perform the band control for each flow because the allocation of the scheduling or the queues is fixed. Furthermore, when performing the scheduling using a Weighted Round Robin (WRR) technique or a Deficit Round Robin (DRR) technique, packets are often continuously sent from a single queue. Consequently, a load tends to be applied on the reception side of packets and thus the communication performance may possible be decreased.

SUMMARY

According to an aspect of an embodiment, a switching device includes: a plurality of queues that receives and stores therein packets and that outputs each of the stored packets; an information acquiring unit that acquires transmission/reception information on the packets stored in each of the queues; a grouping unit that creates, on the basis of the transmission/reception information acquired by the information acquiring unit, a plurality of flow groups to each of which one or a plurality of flows belongs and that allocates the queues to each of the flow groups; and a scheduling unit that determines, on the basis of the transmission/reception information acquired by the information acquiring unit and on the basis of previously determined priority of the queues, the order in which each of the queues is output.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an example of flow identification information;

FIG. 3 is a schematic diagram illustrating an example of flow group definition information;

FIG. 4 is a schematic diagram illustrating an example of policy information;

FIG. 5 is a schematic diagram illustrating an example of scheduling parameters;

FIG. 8 is a schematic diagram illustrating an example of the regulation of changing weight in weight calculation;

FIG. 11 is a schematic diagram illustrating the function "NEXT";

FIG. 15 is a flowchart illustrating the flow of deciding an internal queue that outputs the packets performed by the scheduler according to the second embodiment.

DESCRIPTION OF EMBODIMENTS

Preferred embodiments of the present invention will be explained with reference to accompanying drawings. The switching device and the control method of the switching device are not limited to the embodiments described below.

[a] First Embodiment

Figure 1:
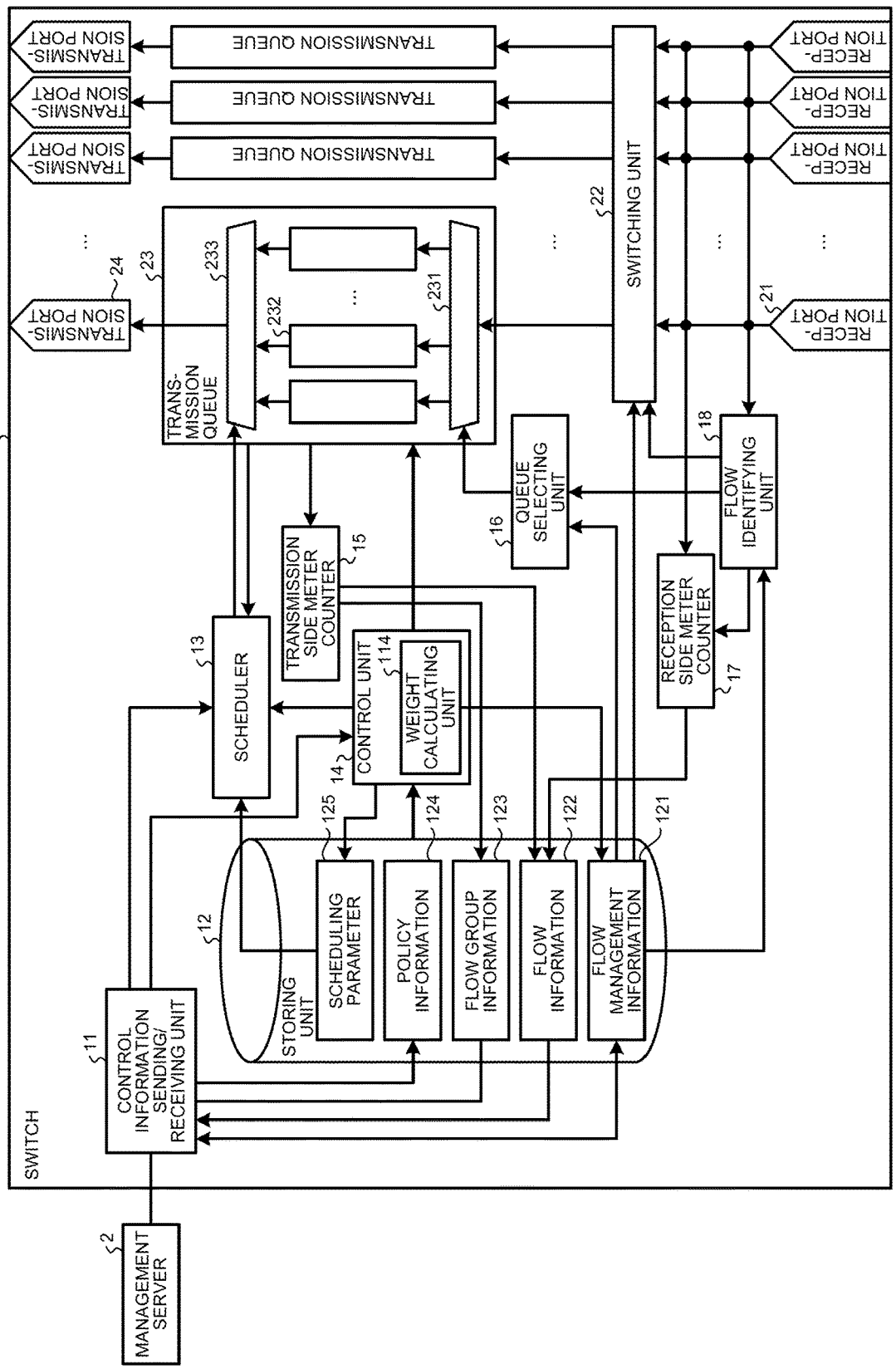
FIG. 1 is a block diagram illustrating a switch according to a first embodiment.

FIG. 1 is a block diagram illustrating a switch according to a first embodiment. A switch 1 is a communication device that receives an input of packets from an external information processing apparatus, such as a server, another switch, or the like, and that transfers the input packets to a specified address. The switch 1 is connected to a management server 2.

The management server 2 controls the sending and receiving of packets to and from a virtual server that is connected to the switch 1. For example, the management server 2 allows each of the virtual servers to send and receive the packets from a certain virtual server to the other virtual server. Namely, the management server 2 holds information on the transmission destination address, the transmission source address, the transmission source port, the transmission destination port, and a protocol that is to be used of each of the packets that are transferred by the switch 1. Furthermore, the management server 2 previously has the priority of each of the internal queues 232 that will be described later. For example, as the priority, 0 to 7 priorities are present; 3 is the reference priority; 7 to 4 are the priorities higher than the reference priority that is held by the internal queue 232; 2 to 0 are the priorities that are to be selected after the internal queue 232 that have the reference priority.

Furthermore, the management server 2 previously has a set band width that is an upper limit of the band width that can be used by the subject flow. Furthermore, the management server 2 previously has information on the grouping at an early stage of each of the flows. Furthermore, the management server 2 previously has an available transmission amount of transmission queues 23, which will be described later, in a single round.

The switch 1 includes, as illustrated in FIG. 1, a control information sending/receiving unit 11, a storing unit 12, a scheduler 13, a control unit 14, a transmission side meter counter 15, a queue selecting unit 16, a reception side meter counter 17, and a flow identifying unit 18. Furthermore, the switch 1 includes reception ports 21, a switching unit 22, the transmission queues 23, and transmission ports 24.

In a description below, the unit of data that is sent and received via the switch 1 is referred to as a packet. For example, in the embodiment, a transmission source Internet Protocol (IP) address, a transmission destination IP address, a transmission source port number, a transmission destination port number, and a protocol number are added to a packet. Furthermore, assemble of a series of packets classified by a condition is referred to as a flow. For example, the assemble of packets classified by the transmission source IP address, the transmission destination IP address, the transmission source port number, the transmission destination port number, and the protocol number corresponds to a flow. Furthermore, a temporary storing unit that stores therein input packets and that sequentially outputs the packets is referred to as a queue.

The switch 1 includes a plurality of reception ports 21. Each of the reception ports 21 is connected to a network connected to each of the external information processing apparatuses. Each of the reception ports 21 receives an input of packets from an external information processing apparatus. Then, each of the reception ports 21 outputs the received packets to the switching unit 22.

The switching unit 22 receives an input of the packet from each of the reception ports 21. In the following, a process that is performed by the switching unit 22 on a single packet from among the packets acquired by the switching unit 22 will be described. However, the process described below is similarly performed on all of the packets.

The switching unit 22 receives, from the flow identifying unit 18, an input of the flow Identifier (ID) that is the identification information of a flow to which a packet belongs. Furthermore, the switching unit 22 acquires, from flow group definition information that is included in flow management information 121, information on the flow group associated with the flow ID that is input from the flow identifying unit 18, i.e., information on the flow group to which the flow that includes the subject packet belongs. Hereinafter, for example, it is assumed that a packet, i.e., a first packet, is present and a flow group to which the flow that includes therein the first packet belongs is simply referred to as a "flow group of the first packet".

Furthermore, the switching unit 22 acquires a transmission destination IP address of a packet. Then, the switching unit 22 extracts, by using the acquired transmission destination IP address, the transmission port 24 that can be used by the output of the subject packet. In addition, the switching unit 22 may also perform the switching by using a MAC address. Then, the switching unit 22 specifies the transmission queue 23 that is connected to the extracted transmission port 24 that can be used. Then, the switching unit 22 outputs the packet to the specified transmission queue 23.

The transmission queue 23 includes a demultiplexer 231, the internal queues 232, and a multiplexer 233. The transmission queue 23 outputs the packet that is output from the switching unit 22 to the transmission port 24 in accordance with an instruction from the scheduler 13 that will be described later. In the following, the transmission queue 23 will be described in detail.

The internal queues 232 are queues each of which stores therein a packet included in the flow belonging to the associated flow group and each of which outputs the packet. Each of the internal queues 232 outputs packets in the order of the timing at which the packet is received first.

An upper limit of the number of the internal queues 232 in the single transmission queue 23 is previously determined. For example, the transmission queue 23 can hold up to the maximum of four internal queues 232. Furthermore, the internal queues 232 that are used in the transmission queue 23 are determined in response to the control received from the control unit 14. Specifically, as will be described later, the internal queues 232 are divided and combined by the control unit 14 and the number of queues that are used is changed. Furthermore, associating a flow group with the internal queues 232 is also performed by the control unit 14.

The demultiplexer 231 receives an input of a packet from the switching unit 22. Furthermore, the demultiplexer 231 receives, from the queue selecting unit 16, which will be described later, an instruction indicating which one of the internal queues 232 is used to store each of the received packets. Then, the demultiplexer 231 stores each of the packets in the internal queue 232 in accordance with the instruction.

The multiplexer 233 receives an input of the information on the internal queues 232 each of which acquires a packet from the scheduler 13 that will be described later. Then, the multiplexer 233 acquires a packet from the specified internal queue 232. Then, the multiplexer 233 outputs the acquired packet to the transmission port 24.

At this point, as will be described later, the multiplexer 233 receives specification of each of the internal queues 232 that are determined by the scheduler 13 using the weight and the priority of each of the internal queues 232. Consequently, the multiplexer 233 can perform a fair output of the packets in accordance with the weight and the priority with respect to each of the flow groups.

Furthermore, the switch 1 includes a plurality of transmission ports 24. Each of the transmission ports 24 is connected to the network connected to each of external information processing apparatuses. Each of the transmission ports 24 receives an input of a packet from the transmission queue 23. Then, each of the transmission ports 24 outputs, to the network, the packet such that the packet is sent to the information processing apparatus that has the transmission destination IP address of the acquired packet.

The storing unit 12 stores therein the flow management information 121, flow information 122, flow group information 123, policy information 124, and a scheduling parameter 125.

The flow management information 121 includes flow identification information 211 and flow group definition information 212. FIG. 2 is a schematic diagram illustrating an example of flow identification information. Furthermore, FIG. 3 is a schematic diagram illustrating an example of flow group definition information.

As illustrated in FIG. 2, in the flow identification information 211, the flow ID is registered for each flow in accordance with the transmission source IP address (SIP: Source IP Address), the transmission destination IP address (DIP: Destination IP Address), the transmission destination port (DP: Destination Port) number, the transmission source port (SP: Source Port) number, and the protocol number (Pro: Protocol) of a packet. The flow identification information 211 is registered by the control information sending/receiving unit 11 that will be described later.

Furthermore, as illustrated in FIG. 3, in the flow group definition information 212, flow groups associated with the flow IDs are registered. Namely, the flow group definition information 212 holds information that indicates which of the flow group includes one of the flows. The flow group definition information 212 is registered by the control unit 14 in accordance with the grouping that is determined by the control unit 14, which will be described later, using the set band width and the statistical information on the internal queues 232, which will be described later.

The flow information 122 is statistical information for each flow when the packet is transferred in the switch 1. The flow information 122 includes statistical information for each flow on the reception side and includes statistical information for each flow on the transmission side.

In the statistical information on the reception side in the flow information 122, a flow reception amount that is a reception amount of each of the flows that is input to the switch 1 per unit time. The statistical information on the reception side in the flow information 122 is registered by the reception side meter counter 17 that will be described later.

In the statistical information on the transmission side in the flow information 122, the flow transmission amount, the flow queue length, and the number of discarded flows are included. The flow transmission amount is an amount of transmission for each flow per unit time. The flow queue length is the sum total of the packet size for each flow stored in each of the internal queues 232. The number of discarded flows is the number of packets for each flow discarded without being stored in the internal queue 232. The statistical information on the transmission side in the flow information 122 is registered by the transmission side meter counter 15 that will be described later.

The flow group information 123 is statistical information on the transmission side for each flow group when packet transmission is performed in the switch 1. At this point, because flows are not classified for each of the flow groups at the time of reception, statistical information for each flow group on the reception side is not present.

The flow group information 123 includes a flow group transmission amount, the flow group queue length, and the number of discarded flow groups. The flow group transmission amount is an amount of transmission for each flow group per unit time. The flow group queue length is the sum total of the packet size for each flow group stored in each of the internal queues 232. The number of discarded flow groups is the number of packets for each flow group discarded without being stored in the internal queue 232. The flow group information 123 is registered by the transmission side meter counter 15 that will be described later.

In the policy information 124, as illustrated in FIG. 4, the set band width that is constraint information is associated with each of the flow IDs and registered. FIG. 4 is a schematic diagram illustrating an example of policy information. The set band width is the band width that is allocated to each of the flows and that can be used by each of the associated flows. The policy information 124 is registered by the control information sending/receiving unit 11 that will be described later.

The scheduling parameter 125 includes a parameter that is used by the scheduler 13 to determine the order of packets when the packets are output from the internal queues 232 that are included in the transmission queue 23. The scheduling parameter 125 includes, for each of the transmission queues 23, for example, as illustrated in FIG. 5, the queue number, the priority, the weight, the average packet length, and a counter area. FIG. 5 is a schematic diagram illustrating an example of a scheduling parameter. The queue number is the number that represents each of the internal queues 232. Furthermore, in the scheduling parameter 125, the priority, the weight, and the average packet length of the internal queues 232 to each of which a queue number is allocated are registered by the control unit 14. In FIG. 5, the priorities are represented by P1 to PN by associating the priority with each of the queue numbers. For example, if the priorities are represented by values of 0 to 7, P1 to PN each are represented by one of the values of 0 to 7. Furthermore, the counter area stored in the scheduling parameter 125 is a work area that is used by the scheduler 13 and the scheduler 13 stores therein the values that are used when the scheduling of an output of packets is performed and then uses the stored value.

The flow identifying unit 18 acquires the transmission source IP address, the transmission destination IP address, the transmission destination port number, the transmission source port number, and the protocol number related to each of the packets that are output from each of the reception ports 21 to the switching unit 22. Then, the flow identifying unit 18 acquires, from the flow identification information 211 included in the flow management information 121, the flow ID that is associated with the acquired information.

Then, the flow identifying unit 18 outputs the acquired flow ID to the queue selecting unit 16, the reception side meter counter 17, and the switching unit 22. At this point, the flow identifying unit 18 outputs the acquired flow ID to each unit so as to determine which of the packets belongs to the flow that is included in the identification information associated with the output flow ID.

The reception side meter counter 17 acquires information on a packet that is output from each of the reception ports 21 to the switching unit 22. Furthermore, the reception side meter counter 17 acquires, from the flow identifying unit 18, the flow ID of the flow to which each of the packets belongs. Then, the reception side meter counter 17 counts the number of packets for each flow and calculates the flow reception amount that is an amount of reception of each flow per unit time. Thereafter, the reception side meter counter 17 associates each of the flow reception amounts with the flow ID and stores the flow reception amounts in the storing unit 12 as the flow information 122.

The queue selecting unit 16 receives, from the flow identifying unit 18, an input of the flow ID of the flow that is output from the switching unit 22 and to which each of the packets belongs. Furthermore, the queue selecting unit 16 acquires information on a flow group associated with each of the flow IDs from the flow group definition information 212 in the flow management information 121.

Then, the queue selecting unit 16 instructs the demultiplexer 231 indicating each of the packets that are input to the transmission queues 23 is to be stored which of the internal queues 232. At this time, the queue selecting unit 16 instructs the demultiplexer 231 to store, if the packets belong to the same flow group, the packets in the same internal queue 232. Furthermore, if the packets belong to different flow groups, the queue selecting unit 16 instructs the demultiplexer 231 to store the packets in the different internal queues 232.

For example, it is assumed that the transmission queue 23 includes internal queues #1 to #4 as the internal queue 232. Furthermore, as illustrated in FIG. 3, it is assumed that the flows with the flow IDs of F1 and F2 belong to the flow group of FG1 and it is assumed that the flow with the flow ID of F3 belongs to the flow group of FG2. In this case, if it is determined that the packet in the flow group of FG1 is stored in one of the queues from among the internal queues #1 to #4, for example, in the internal queue #1, the queue selecting unit 16 instructs the demultiplexer 231 to store, in the internal queue #1, the packet belonging to the flows of F1 and F2. Furthermore, the queue selecting unit 16 selects, as the internal queue 232 that is used to store the packet in the flow group of FG2, one of the internal queues #2 to #4, for example, the internal queue #2. In this case, the queue selecting unit 16 instructs the demultiplexer 231 to store, in the internal queue #2, the packet belonging to the flow of F3.

Thereafter, it is assumed that the flow group of FG1 is divided into FG3 and FG4 by the control unit 14 and is changed such that the flow of F1 is to belong to the flow group of FG3 and the flow of F2 is to belong to the flow group of FG4. In this case, the queue selecting unit 16 recognizes that the flow group of FG1 to which F1 and F2 belong up to now is different from the flow group of FG3 to which F1 belongs from now on and the flow group to which F2 and FG4 belong. Thus, the queue selecting unit 16 allocates either one of the internal queues #3 and #4 to the flow groups of FG3 and FG4. In this case, the queue selecting unit 16 allocates the internal queue #3 to the flow group of FG3 and allocates the internal queue #4 to the flow group of FG4. Thus, the queue selecting unit 16 instructs the demultiplexer 231 to stop to store the packet belonging to F1 and F2 in the internal queue #1, to store the packet belonging to F1 in the internal queue #3, and to store the packet belonging to F2 in the internal queue #4. Consequently, the internal queue packet #1 is not used any more. In this way, the queue selecting unit 16 acquires information on the flow groups and allocates one of the internal queues 232 to each of the flow groups. Namely, the internal queue 232 is always associated with the flow group one to one.

The transmission side meter counter 15 acquires the information on the packets output from each of the internal queues 232 in each of the transmission queues 23. Because the internal queues 232 are allocated for the flow groups, this information corresponds to the information on the packet output for each flow group. Then, the transmission side meter counter 15 calculates the flow group transmission amount that is the transmission amount of the packet for each of the internal queues 232 per unit time, i.e., the transmission amount of the packet for each flow group per unit time.

Furthermore, the transmission side meter counter 15 calculates the sum total of the packet size stored for each of the internal queues 232. Because the internal queue 232 is associated with a single flow group, this calculated value corresponds to the flow group queue length that is the size of each of the flow groups stored in the internal queue 232. Namely, the transmission side meter counter 15 calculates the flow group queue length.

Furthermore, the transmission side meter counter 15 counts the number of packets discarded for each of the internal queues 232. Because the internal queue 232 is associated with a single flow group, the number of these packets corresponds to the number of discarded flow groups that is the number of packets discarded for each flow group. Namely, the transmission side meter counter 15 calculates the number of discarded flow groups.

Then, the transmission side meter counter 15 registers the calculated flow group transmission amount, the flow group queue length, and the number of discarded flow groups as the flow group statistical information in the flow group information 123.

Furthermore, the transmission side meter counter 15 monitors an output of each of the internal queues 232 and calculates the flow transmission amount that is the transmission amount for each flow. Furthermore, the transmission side meter counter 15 calculates the flow queue length that is the sum total of the size for each flow stored in the internal queue 232. Furthermore, the transmission side meter counter 15 calculates the number of discarded flows that is the number of discarded packets for each flow. Then, the transmission side meter counter 15 registers the calculated flow transmission amount, the flow queue length, and the number of discarded flows as flow statistical information in the flow information 122. The transmission side meter counter 15 mentioned here and the reception side meter counter 17 described above corresponds to an example of an "information acquiring unit".

The control information sending/receiving unit 11 acquires the structure definition from the management server 2. In the structure definition, the flow identification information 211 and the policy information 124 are included.

Furthermore, in the structure definition, the priority of the queues and the average packet length are included.

The control information sending/receiving unit 11 stores the flow identification information 211 and the policy information 124 in the storing unit 12. Furthermore, the control information sending/receiving unit 11 outputs the priority of the queues and the average packet length to the control unit 14.

Furthermore, the control information sending/receiving unit 11 acquires, from the management server 2, the information on the grouping at an early stage of each of the flows and the available transmission amount of the transmission queue 23 in a single round. Then, the control information sending/receiving unit 11 outputs the information on the flow group at an early stage of each of the flows and the available transmission amount of the transmission queue 23 in a single round to the control unit 14.

Furthermore, the control information sending/receiving unit 11 acquires the flow information 122 and the flow group information 123 from the storing unit 12. Then, the control information sending/receiving unit 11 sends the flow information 122 and the flow group information 123 to the management server 2.

The control unit 14 includes a weight calculating unit 114. The control unit 14 performs control of a use state of the internal queues 232 due to the creation of a flow group and performs control of adjustment of an output from the internal queues 232 due to adjustment of the scheduling parameter.

Creating a flow group performed by the control unit 14 will be described. Briefly, the control unit 14 performs the grouping of the flows by using the flow information 122, the flow group information 123, and the policy information 124 and creates a flow group. Then, the control unit 14 registers the information on the created flow group in the flow group definition information 212 in the flow management information 121. Consequently, the control unit 14 controls restructuring, such as allocation of the internal queues 232 for each flow group, dividing and combining of the internal queues 232, or the like. In the following, creating a flow group performed by the control unit 14 will be described in detail.

The control unit 14 acquires the information on the grouping at an early stage of the flow from the control information sending/receiving unit 11. Then, the control unit 14 registers, in accordance with the acquired information on the grouping at an early stage of the flow, the flow group associated with each of the flows in the flow group definition information 212 in the flow management information 121.

In the following, a description will be given of a case in which a certain single flow group is divided, i.e., will be given of determination that is performed to divide the internal queues 232. The control unit 14 previously stores therein a division threshold of the rate of deviation between the throughput of a flow group and the set band width. Furthermore, the control unit 14 acquires, from the flow information 122, the throughput of each of the flows belonging to the flow group, i.e., the flow transmission amount. Furthermore, the control unit 14 acquires, from the policy information 124, the set band width of each of the flows included in the flow group.

Then, the control unit 14 subtracts, for each flow belonging to the flow group, the set band width of the flow from the throughput of the flow, calculates the value obtained by dividing the subtraction result by the set band width of the flow, and set the division result as the rate of deviation. The rate of deviation indicates a shift amount of the throughput of the flow from the set band width. Here, $D_{flow}$=(flow throughput−flow set band width)/flow set band width is obtained, where the rate of deviation is represented by $D_{flow}$.

Then, the control unit 14 calculates the total sum of the calculated rate of deviation with a positive value and sets the obtained result to the rate of deviation of the flow group. For example, $D_{FG}=\Sigma_{flow \in FG} \max(D_{flow}, 0)$ is obtained, where the rate of deviation of the flow group is represented by $D_{FG}$.

Then, the control unit 14 determines whether the rate of deviation of the flow group exceeds the division threshold. If the rate of deviation of the flow group exceeds the division threshold, i.e., if "$D_{FG}$>division threshold" is satisfied, the control unit 14 determines to divide the subject flow group.

The control unit 14 collectively sets the flows in each of which the rate of deviation has a positive value, from among the flows belonging to the flow group that is determined to be divided, to a single flow group. Furthermore, the control unit 14 collectively sets the remaining flow, from among the flows belonging to the flow group that is determined to be divided, to another single flow group. For example, when the flow group FG1 is divided into FG3 and FG4, FG3={flow of [$D_{flow}$>0]} and FG4=FG1−FG3 are obtained. However, this grouping method is an example and another method may also be used as long as the flows belonging to the flow group can be divided into a plurality of groups.

Figure 6:
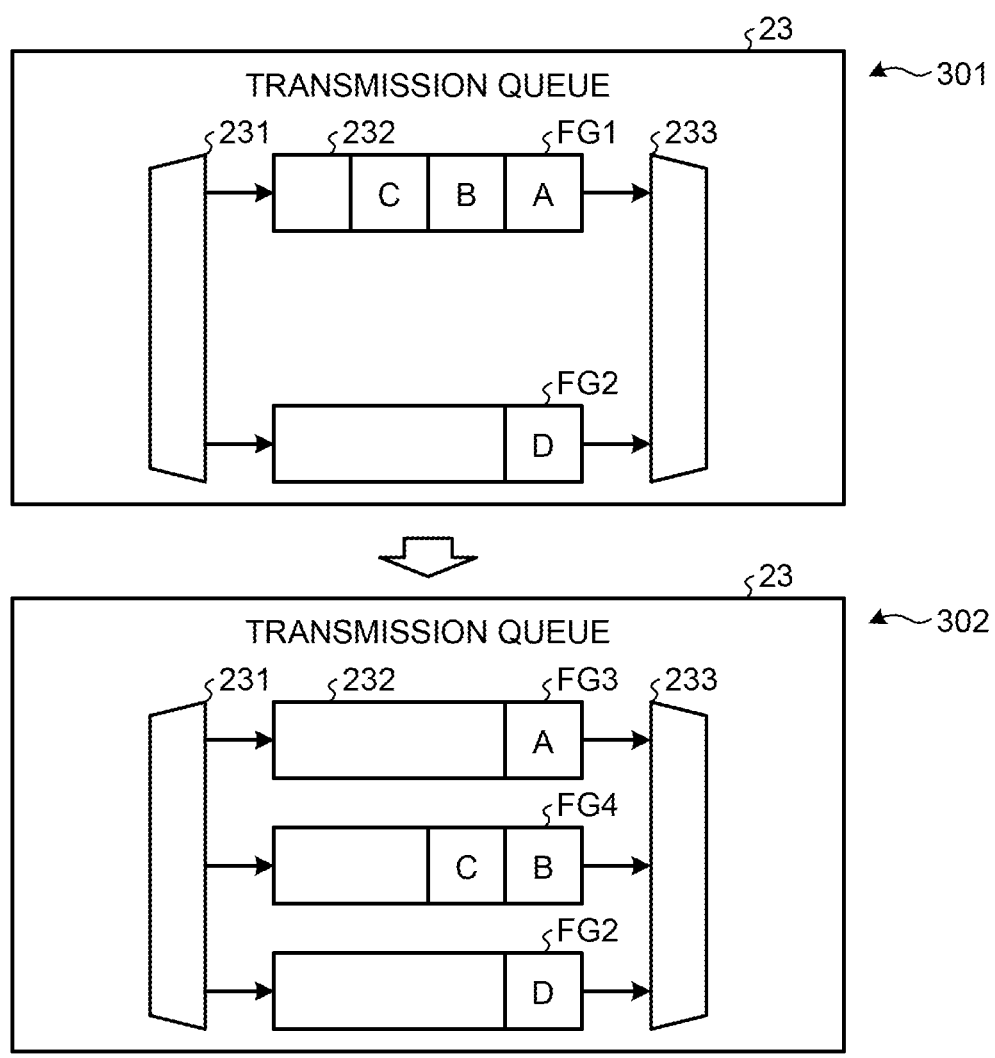
FIG. 6 is a schematic diagram illustrating dividing flow groups.

For example, dividing a flow group performed by the control unit 14 will be described with reference to FIG. 6. FIG. 6 is a schematic diagram illustrating dividing a flow group. A state 301 illustrated in FIG. 6 represents the state before division. Furthermore, a state 302 represents the state after division. Here, in FIG. 6, the internal queues 232 that are not used are not illustrated. Furthermore, the symbols A to D illustrated in FIG. 6 represent the packets that are included in the flows A to D, respectively.

In the state 301, the flows A to C are included in the flow group FG1. Here, the flow group formed in this way and the state of these flows are represented by FG1={A,B,C}. Furthermore, the flow D is included in the flow group FG2. This is represented by FG2={D}.

In the following, dividing the flow group FG1 performed by the control unit 14 will be described as an example. The control unit 14 calculates the rate of deviation ($D_{flow}$) of the flows A to C. Here, the rate of deviation of the flows A to C are represented by $D_A$ to $D_C$, respectively. Furthermore, the control unit 14 calculates the rate of deviation $D_{FG1}$ of the flow group FG1. Then, if the rate of deviation $D_{FG1}$ of the flow group FG1 exceeds the division threshold, the control unit 14 splits the flow group FG1. At this time, if $D_A$>0, $D_B$≤0, and $D_C$≤0, the control unit 14 allows, as indicated by the state 302, the flow A to belong to the divided flow group FG3 and allows the flows B and C to belong to the flow group FG4. Namely, the divided flow group is represented by FG3={A} and FG4={B,C}.

In the following, a case in which a plurality of certain flow groups is combined, i.e., determination performed to combine the internal queues 232 will be described. When the control unit 14 divides the flow group, if the number of the available internal queues 232 exceeds the upper limit, the control unit 14 decides to perform combining the queues.

Here, the control unit 14 allows the flows belonging to the flow groups, which are to be combined, to belong to a new flow group. Consequently, all of the flows belonging to the previous flow groups before the combination belong to the new flow group. Thereafter, if all of the packets stored in the internal queues 232 that are allocated to the flow groups before the combination are output, the subject internal queues 232 become empty and become an unused state. In contrast, the packets included in the flows that belong to the flow groups before combination are stored in the internal queues 232 that are allocated to the newly created flow groups. In this way, the control unit 14 collects the plurality of flow groups into a single flow group.

Figure 7:
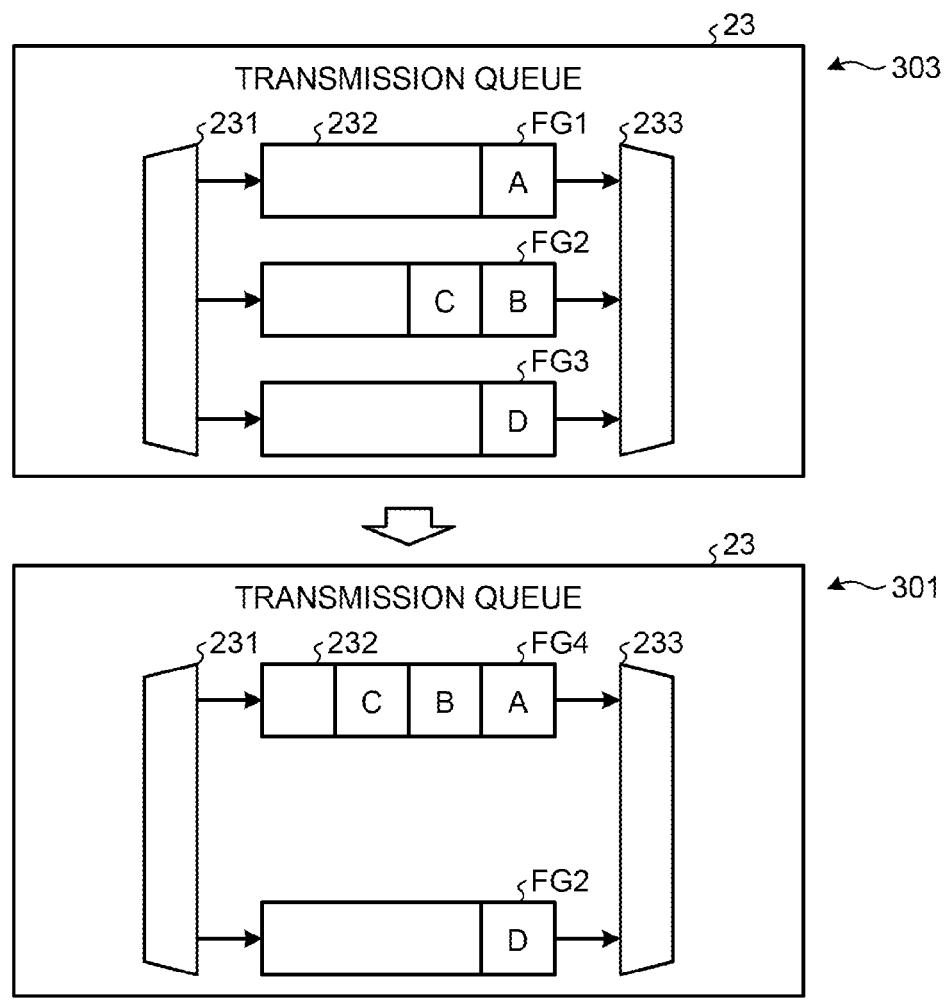
FIG. 7 is a schematic diagram illustrating combining the flow groups.

For example, combining the flow groups performed by the control unit 14 will be described with reference to FIG. 7. FIG. 7 is a schematic diagram illustrating combining the flow groups. A state 303 illustrated in FIG. 7 represents the state before combination. Furthermore, a state 304 represents the state after the combination. Here, in FIG. 7, the internal queues 232 that are not used are not illustrated. Furthermore, the symbols A to D illustrated in FIG. 7 represent the packets that are included in the flows A to D, respectively.

For example, a case in which the flow groups FG1 and FG2 are combined and set to a flow group FG4 will be described. In the state 303, it is assumed that the flow A belongs to the flow group FG1, it is assumed that the flows B and C belong to the flow group FG2, and it is assumed that the flow D belongs to the flow group FG3. Namely, this state can be represented by FG1={A}, FG2={B,C}, and FG3={D}.

The control unit 14 creates the flow group FG4. Then, the control unit 14 allows the flows A to C to belong to the flow group FG4. Namely, FG4={A,B,C} is obtained. At this time, the transmission queue 23 becomes the state indicated by the state 304. Consequently, the two internal queues 232 that were allocated to the flow groups FG1 and FG2 become unused and, instead of these, the internal queue 232 that was allocated to the flow group FG3 becomes in a use state. Namely, the single unused internal queue 232 is added due to the combination.

In the following, registering the scheduling parameter 125 performed by the control unit 14 will be described. The control unit 14 includes, for each of the transmission queues 23 in advance, the queue number of each of the internal queues 232 included in the transmission queue 23. For example, if N number of the internal queues 232 is present in the transmission queue 23, the transmission queue 23 includes #1 to #N as the queue number of the internal queues 232.

Furthermore, the control unit 14 receives, from the control information sending/receiving unit 11, an input of the priority and the average packet length of the internal queues 232 that are included in the transmission queue 23.

If the setting of the scheduling parameter 125 is the first time, the control unit 14 registers the priority, the weight, and the average packet length in the scheduling parameter 125 by associating them with the queue number allocated to each of the internal queues 232. At this point, at the initial registration, the weight of each of the internal queues 232 may all be the same.

Then, the control unit 14 calculates the weight of each of the internal queues 232 by using the weight calculating unit 114. In the following, calculating the weight performed by the weight calculating unit 114 will be described by using the single internal queue 232 as an example. Here, a case of calculating the setting of the band width of the internal queue 232 that is allocated to the flow group FG1 will be described. The weight calculating unit 114 previously stores therein the discard threshold and the queue length threshold.

The weight calculating unit 114 sets, as the initial state, for example, each of the internal queues 232 to the same weight. Then, the weight calculating unit 114 acquires the set band width of each of the flows in the flow group FG1 from the policy information 124. Then, the weight calculating unit 114 calculates the sum total of the set band width of each of the flows belonging to the flow group and sets the obtained result as the band width of the internal queue 232. Here, the band width of the internal queue 232 is represented by Bq, the flow belonging to the flow group FG1 is represented by flow, and, furthermore, the band width of the flow is represented by $BW_{flow}$. At this point, the weight calculating unit 114 calculates the band width of the internal queue 232 by using equation represented by $Bq=\Sigma_{flow \in FG1} BW_{flow}$.

Furthermore, the weight calculating unit 114 sets the sum total of the band width of all of the internal queues 232 that are included in the transmission queue 23 to the entire band width of the transmission queues 23. Namely, the entire band width of the transmission queues 23 is represented by S, the internal queues 232 included in the target transmission queue 23 is represented by q, and the set thereof is represented by Q, the weight calculating unit 114 calculates the entire band width of the transmission queue 23 by using the equation represented by $S=\Sigma_{q \in Q} Bq$.

Then, if the band width of the transmission port 24 to which the target transmission queue 23 is connected is greater than the calculated entire band width (S) of the transmission queue 23, the weight calculating unit 114 normalizes the band width of each of the internal queues 232. Specifically, the weight calculating unit 114 divides the band width (Bq) of each of the internal queues 232 by the calculated entire band width (S) of the transmission queue 23. Then, when the band width of the transmission port 24 is represented by $BW_L$, the weight calculating unit 114 sets the value obtained by multiplying the division result by the band width ($BW_L$) of the transmission port 24 as the band width of the normalized internal queues 232. Namely, when the band width of the normalized internal queues 232 is represented by BWq, the weight calculating unit 114 calculates the band width of the normalized internal queue 232 by using the equation represented by $BWq=(Bq/S) \times BW_L$.

In contrast, if the band width of the transmission port 24 to which the target transmission queue 23 is connected is equal to or less than the calculated entire band width (S) of the transmission queue 23, the weight calculating unit 114 sets the calculated band width (Bq) of the internal queues 232 to the normalized band width.

The weight calculating unit 114 acquires the flow group transmission amount, the flow group queue length, and the number of discarded flow groups of the flow group allocated to each of the internal queues 232 from the flow group information 123. Then, the weight calculating unit 114 compares the flow group transmission amount with the calculated set band width of each of the internal queues 232. If the flow group transmission amount is smaller than the set band width of the certain internal queue 232, the weight calculating unit 114 increases the weight of the subject internal queue 232. Furthermore, if the flow group transmission amount is the same as the set band width of the certain internal queue 232, the weight calculating unit 114 maintains the weight of the subject internal queue 232. Furthermore, if the flow group transmission amount is greater than the set band width of the certain internal queue 232, the weight calculating unit 114 decreases the weight of the subject internal queues 232.

Furthermore, the weight calculating unit 114 compares the number of discarded flow groups with the discard threshold. If the number of discarded flow groups is greater than the discard threshold, the weight calculating unit 114 increases the weight of the subject internal queue 232. Furthermore, if the number of discarded flow groups is the same as the discard threshold, the weight calculating unit 114 maintains the weight of the subject internal queue 232. Furthermore, if the number of discarded flow groups is smaller than the discard threshold, the weight calculating unit 114 decreases the weight of the subject internal queue 232.

Furthermore, the weight calculating unit 114 compares the flow group queue length with the queue length threshold. If the flow group queue length is greater than the queue length threshold, the weight calculating unit 114 increases the weight of the subject internal queue 232. Furthermore, if the flow group queue length is the same as the queue length threshold, the weight calculating unit 114 maintains the weight of the subject internal queue 232. Furthermore, if the flow group queue length is smaller than the queue length threshold, the weight calculating unit 114 decreases the weight of the subject internal queue 232.

In the following, an example of calculating the weight of the internal queue 232 performed by the weight calculating unit 114 will further specifically be described. Here, the weight of the current internal queue 232 is represented by $W_{CURRENT}$ and the weight that is newly calculated is represented by $W_{NEW}$. In this case, because the weight calculating unit 114 receives, from the control information sending/receiving unit 11, an input of the weight (Kt) of the throughput, the weight (Kd) of the number of discarded packets, and the weight (Kq) of the queue length, which are used to calculate the weight of the internal queues 232. Then, the weight calculating unit 114 calculates the value by multiplying the weight of the throughput by the value obtained by subtracting the set band width (set BW: Band Width) from the flow group transmission amount (TP: Throughput). Furthermore, the weight calculating unit 114 calculates the value by multiplying the weight of the number of discarded packets by the value obtained by subtracting the discard threshold from the number of discarded flow groups (Drop). Furthermore, the weight calculating unit 114 calculates the value by multiplying the weight of the queue length by the value obtained by subtracting the queue length threshold from the flow group queue length (Qlen: Q Length). Then, by adding the calculated three values to the current weight, the weight calculating unit 114 calculates the new weight. Namely, by calculating $W_{NEW}=W_{CURRENT}+Kt$ (TP−set BW)+Kd(Drop−Drop threshold)+Kq(Qlen−Qlen threshold), the weight calculating unit 114 calculates the new weight of the internal queue 232.

Furthermore, the following another method may also be used as another example of calculating the weight of the internal queue 232 performed by the weight calculating unit 114. The weight calculating unit 114 includes a three-dimensional table that is used to determine a change value of the weight and in which the value obtained by subtracting the set band width from the flow group transmission amount, the value obtained by subtracting the discard threshold from the number of discarded flow groups, and the value obtained by subtracting the queue length threshold from the flow group queue length are used as the keys. Then, the weight calculating unit 114 calculates the change value of the weight from the three-dimensional table by using the calculated values as the keys. Then, the weight calculating unit 114 calculates the new weight by adding the change value of the weight to the current weight.

FIG. 8 is a schematic diagram illustrating an example of the regulation of changing weight in weight calculation. As described above, in accordance with the regulation illustrated in FIG. 8, the weight calculating unit 114 determines the weight of the internal queue 232 by using the flow group transmission amount, the number of discarded flow groups, and the flow group queue length in each of the internal queues 232. Then, the weight calculating unit 114 normalizes, in the transmission queue 23, the obtained weight of the internal queues 232 and sets the normalized weight as the weight of each of the internal queues 232. For example, if #1 to #4 are present as the internal queues 232, when the weight before the normalization is represented by W#1 to W#4, the weight of the internal queue 232 with the queue number of #1 after the normalization is represented by W#1/(W#1+W#2+W#3+W#4).

Then, the control unit 14 registers, in the scheduling parameter 125, the weight of each of the internal queues 232 calculated by the weight calculating unit 114. In this way, by using the statistical information on the flow group, the control unit 14 changes the weight of the internal queues 232 in line with the state of each of the internal queues 232. The control unit 14 mentioned here corresponds to an example of a "grouping unit".

The scheduler 13 determines the order of the internal queues 232 that output the packets by using the scheduling parameter 125. Furthermore, the scheduler 13 allows the multiplexer 233 to acquire the packets from the internal queues 232 in accordance with the determined order. Consequently, the scheduler 13 adjusts the output of the flows while maintaining the fairness.

Specifically, the scheduler 13 refers to the priority of each of the internal queues 232 in the scheduling parameter 125. Here, as described above, 3 is set to the reference priority, 7 to 4 are set to the priority higher than the reference priority, 2 to 0 is set to the priority lower than the reference priority. First, the scheduler 13 outputs packets with a high priority from among the internal queues 232 with the priorities 7 to 4.

Then, the scheduler 13 determines the order of internal queues 232, from among the internal queues 232 with the priority of 3, that output the packets by using WRR (Weight Round Robin) or DDR (Deficit Round Robin).

For example, if WRR is used, the scheduler 13 acquires the weight and the average packet length of the internal queues 232 from the scheduling parameter 125. Then, the scheduler 13 calculates the normalized weight of the internal queue 232 by dividing the weight of the internal queue 232 by the average packet length of the internal queues 232.

Then, the scheduler 13 specifies the minimum value from the calculated normalized weight. Furthermore, the scheduler 13 calculates the number of transmission packets for each of the internal queues 232 by dividing the normalized weight of each of the internal queues 232 by the minimum value of the weight. Then, the scheduler 13 determines the order in which the internal queues 232 are output such that the packets the number of which corresponds to the number of calculated transmission packets are output from the associated internal queue 232. Then, the scheduler 13 controls the multiplexer 233 such that the packets are acquired from the internal queues 232 in the determined order in which the internal queue 232 are output. Furthermore, if the internal queue 232 becomes empty, the scheduler 13 instructs the multiplexer 233 to stop to acquire the packets from the subject internal queue 232.

Furthermore, for example, if DRR is used, the scheduler 13 acquires the available transmission amount in one round from the control information sending/receiving unit 11. Then, the scheduler 13 calculates the communication traffic of each of the internal queues 232 per round by multiplying the available transmission amount by the weight of each of the internal queues 232.

Then, the scheduler 13 sets the calculated communication traffic of each of the internal queues 232 per round in the counter area of the scheduling parameter 125. Then, if the packets that can be output are present in the certain internal queue 232 and if the count indicated by the counter is not negative, the scheduler 13 controls the multiplexer 233 such that the packets are acquired from the subject internal queue 232. Then, the scheduler 13 subtracts the size of the packets corresponding to the output from the counter. Then, at the end of the round, the scheduler 13 registers, in the counter, the value obtained by multiplying the available transmission amount by the weight of the internal queue 232. The scheduler 13 repeatedly sends the instruction to calculate the communication traffic per round, to register the counter, to output the packets while decreasing the counter until no packet that is to be output is present.

Then, when an output of the packets stored in the internal queue 232 with the priority of 3 has been ended, the scheduler 13 then outputs packets in accordance with the priority of the internal queues 232 with the priorities of 0 to 2. The scheduler 13 mentioned here corresponds to an example of a "scheduling unit".

Figure 9:
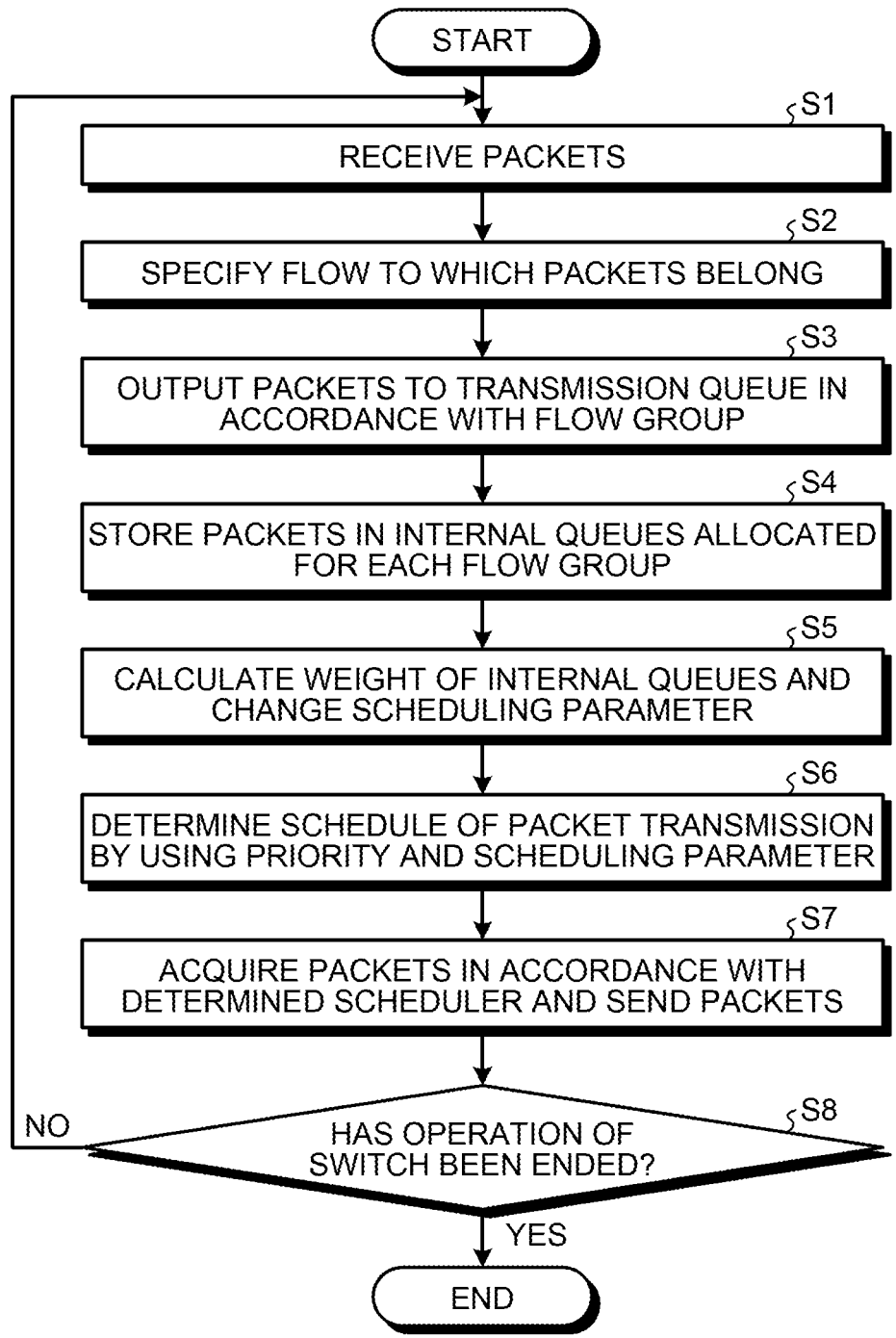
FIG. 9 is a flowchart illustrating the flow of a packet transfer process performed in the switch according to the first embodiment.

In the following, the overall flow of the packet transfer performed in the switch 1 according to the embodiment will be described with reference to FIG. 9. FIG. 9 is a flowchart illustrating the flow of a packet transfer process performed in the switch according to the first embodiment.

The reception port 21 receives packets from an external information processing apparatus (Step S1). Then, the reception port 21 outputs the received packets to the switching unit 22.

The flow identifying unit 18 acquires the transmission source IP address, the transmission destination IP address, the transmission destination port number, the transmission source port number, and the protocol number of the packets that are output from the reception port 21 to the switching unit 22. Then, the flow identifying unit 18 acquires the flow ID associated with the acquired information from the flow identification information 211 that is included in the flow management information 121 and specifies the flow to which each of the associated packets belongs (Step S2). The flow identifying unit 18 outputs, to the switching unit 22, the flow ID of the flow to which each of the associated packets belongs.

The switching unit 22 receives an input of the packets from the reception port 21. Furthermore, the switching unit 22 acquires, from the flow identifying unit 18, the flow ID of the flow to which each of the received packets belongs. Then, the switching unit 22 specifies the flow group of each of the packets from the flow group definition information 212 in the flow management information 121. Then, the switching unit 22 determines the transmission queue 23 that output each of the packets in accordance with the specified flow group and sends each of the packets to the determined transmission queue 23 (Step S3).

The queue selecting unit 16 specifies the flow group for each of the packets from the flow group definition information 212 in the flow management information 121. Then, if the internal queue 232 is not allocated to the specified flow group, the queue selecting unit 16 selects the single internal queue 232 from among the unused internal queues 232 and allocates the internal queue 232 to the flow group. Then, the queue selecting unit 16 stores, for each flow group, the packets in the allocated internal queues 232 (Step S4).

The weight calculating unit 114 in the control unit 14 calculates the weight of each of the internal queues 232 by using the flow group transmission amount, the flow group queue length, and the number of discarded flow groups. Then, the control unit 14 registers the weight of each of the internal queues 232 calculated by the weight calculating unit 114 into the scheduling parameter 125 and changes the scheduling parameter 125 (Step S5).

The scheduler 13 acquires the priority from the scheduling parameter 125 and determines that the packets stored in the internal queue 232 that has the priority higher than the reference priority are to be output before the packets stored in the internal queue 232 with the reference priority. Then, the scheduler 13 acquires, in the internal queue 232 with the reference priority, the weight of the internal queues 232 and the average packet length of the internal queues 232 and determines, by using the counter and WRR or DRR, the schedule for the packet transmission. Furthermore, the scheduler 13 determines that the packets stored in the internal queue 232 with the priority lower than the reference priority are to be output after the packets stored in the internal queue 232 with the reference priority (Step S6). Then, the scheduler 13 instructs the multiplexer 233 to acquire the packets from the internal queues 232 in accordance with the determined schedule.

The multiplexer 233 acquires the packets from the internal queue 232 that acquires the packets in accordance with the instruction from the scheduler 13 and sends the packets to the destination external device via the transmission port 24 (Step S7).

Then, the scheduler 13 and the control unit 14 determine whether the operation of the switch 1 needs to be ended (Step S8). If the operation of the switch 1 is not ended (No at Step S8), the process returns to Step S1.

In contrast, if the operation of the switch 1 is ended (Yes at Step S8), the scheduler 13 and the control unit 14 ends the transfer process of the packet.

Figure 10:
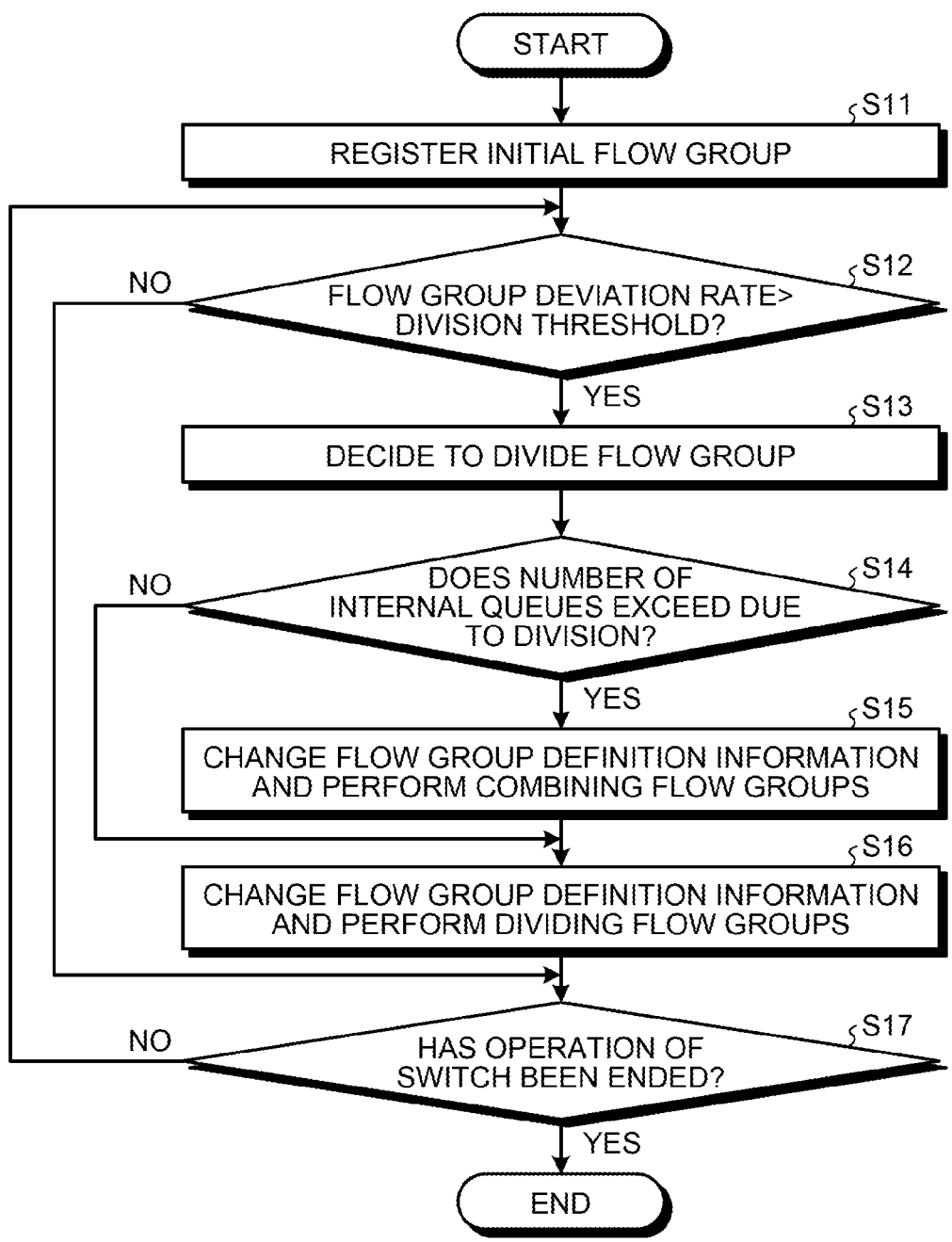
FIG. 10 is a flowchart illustrating the flow of a process of restructuring the flow groups.

In the following, the flow of the process of restructuring the flow groups performed by the control unit 14 will be described with reference to FIG. 10. FIG. 10 is a flowchart illustrating the flow of a process of restructuring the flow groups.

The control unit 14 identifies the flows on the basis of the flow identification information 211 and creates the initial flow group that includes each of the flows. Then, the control unit 14 registers the flow group associated with each of the flows in the flow group definition information 212 (Step S11).

Thereafter, the control unit 14 acquires the transmission amount of the flows from the flow information 122. Furthermore, the control unit 14 acquires the set band width of each of the flows from the policy information 124. Then, the control unit 14 calculates the rate of deviation from the transmission amount of each of the flows and the set band width of each of the flows. Furthermore, the control unit 14 calculates the flow group deviation rate from the calculated rate of deviation. Then, the control unit 14 determines whether the flow group deviation rate exceeds the division threshold (Step S12).

If the flow group deviation rate does not exceed the division threshold (No at Step S12), the control unit 14 proceeds to Step S17.

In contrast, if the flow group deviation rate exceeds the division threshold (Yes at Step S12), the control unit 14 decides to divide the flow group (Step S13).

Then, the control unit 14 determines whether the number of internal queues 232 that are used due to division exceeds an upper limit of the number of the internal queues 232 that can be used (Step S14). If the number of internal queues 232 that are to be used does not exceed the upper limit (No at Step S14), the control unit 14 proceeds to Step S16.

In contrast, if the number of internal queues 232 that are to be used exceeds the upper limit (Yes at Step S14), the control unit 14 changes the flow group definition information 212 such that a plurality of flows belonging to different flow groups belongs to a single flow group and performs combining the flow groups (Step S15). Specifically, in accordance with the changed flow group definition information 212, the queue selecting unit 16 gives an instruction to the demultiplexer 231 indicating the storage destination of the packets, whereby combining the flow groups is implemented.

Then, the control unit 14 changes the flow group definition information 212 such that a plurality of flows belonging to a single flow group belongs to a plurality of different flow groups and then performs dividing the flow group (Step S16). Specifically, the queue selecting unit 16 gives an instruction to the demultiplexer 231 indicating the storage destination of the packets in accordance with the changed flow group definition information 212, whereby dividing the flow group is implemented.

Thereafter, the control unit 14 determines whether the operation of the switch 1 needs to be ended (Step S17). If the operation of the switch 1 is not ended (No at Step S17), the control unit 14 returns to Step S12. In contrast, if the operation of the switch 1 is ended (Yes at Step S17), the control unit 14 ends the restructuring process of the flows.

At this point, for the processes performed at Steps S3 and S4 illustrated in FIG. 9, for example, the flow group definition information 212 that is periodically updated on the basis of the flow illustrated in FIG. 10 is used.

As described above, if the throughput of each of the flows belonging to the flow group is decreased, the switch according to the embodiment divides the subject flow group and outputs the packets from each of the internal queues by using WRR, DRR, or the like. Consequently, the flows with decreased throughput are stored in a plurality of internal queues and the possibility that the flows are output is increased. Accordingly, it is possible to improve the throughput of the flows with decreased throughput and it is possible to implement an improvement of the overall communication performance as a switch and sharing of network resources in a fair manner.

Furthermore, because the switch according to the embodiment selects an internal queue that outputs the packets in accordance with the priority, it is possible to implement the communication quality conforming to the priority.

Modification

In the following, a modification of the first embodiment will be described. In the first embodiment, the transmission side meter counter 15 acquires the statistical information on the flows and stores the acquired statistical information in the flow information 122. However, it is often difficult to acquire the statistical information for each of the flows that are stored in the same internal queue 232 as the flow group. Thus, the control unit 14 according to the modification differs from the first embodiment in that the statistical information on the flows on the transmission side is calculated from the statistical information on the flow group. The switch 1 according to the modification can also be represented by the block diagram illustrated in FIG. 1. In a description below, for the components having the same function as those described in the first embodiment, descriptions thereof will be omitted.

The transmission side meter counter 15 acquires the information related to the packets that are output from each of the internal queues 232 in each of the transmission queues 23. Then, the transmission side meter counter 15 calculates the flow group transmission amount, the flow group queue length, and the number of discarded flow groups.

Then, the transmission side meter counter 15 registers the calculated flow group transmission amount, the flow group queue length, and the number of discarded flow groups in the flow group information 123 as the flow group statistical information.

In contrast, in the embodiment, the transmission side meter counter 15 does not acquire the statistical information for each flow. Namely, in the flow information 122, the statistical information on the flows on the transmission side is not stored.

The control unit 14 acquires the flow group transmission amount, the flow group queue length, and the number of discarded flow groups from the flow group information 123. Furthermore, the control unit 14 acquires the reception amount of the flows from the flow information 122. Furthermore, the control unit 14 specifies, from the flow group definition information 212, the flows that construct each of the flow groups.

Then, the control unit 14 calculates the weight of each of the flows by dividing the reception amount of the flows by the sum total of the reception amount of the flows belonging to the flow group to which the subject flow belongs. The weight of this flow indicates the percentage of the subject flow occupied in the flow group to which the subject flow belongs. Then, the control unit 14 calculates the flow transmission amount by multiplying the calculated weight of the flow by the flow group transmission amount. Furthermore, the control unit 14 calculates the flow queue length by multiplying the calculated weight of the flow by the flow group queue length. Furthermore, the control unit 14 calculates the number of discarded flows by multiplying the weight of the flow by the number of discarded flow groups. Then, the control unit 14 registers the calculated flow transmission amount, the flow queue length, and the number of discarded flows in the flow information 122.

Furthermore, the control unit 14 restructures the flow groups by using the calculated flow transmission amount.

As described above, the switch according to the embodiment calculates the statistical information for each flow from the statistical information on the flow groups. Namely, even if it is difficult to acquire the statistical information for each flow from the transmission queue, the switch according to the embodiment can calculate the flow transmission amount, can perform grouping similarly to the first embodiment, and can implement an improvement of the overall communication performance as a switch and sharing of network resources in a fair manner.

[b] Second Embodiment

In the following, the second embodiment will be described. The switch 1 according to the embodiment decides, regarding the internal queues 232 that have the reference priority, the internal queue 232 that acquires a transmission request performed by the scheduler 13 using an algorithm in which an improvement is added to DRR. Then, the scheduler 13 selects the internal queue 232 that outputs the packets from among the internal queues 232 that acquire the transmission request. Then, the scheduler 13 repeatedly selecting the internal queues 232 that acquire the transmission request and that output the packets. The switch 1 according to the embodiment is also represented by the block diagram illustrated in FIG. 1. Furthermore, in a description below, for the components having the same function as those described in the first embodiment, descriptions thereof will be omitted.

First, deciding the internal queue 232 that acquires the transmission request will be described. The scheduler 13 acquires, from the control information sending/receiving unit 11, the available transmission amount of each of the internal queues 232 in a single round. Furthermore, the scheduler 13 acquires the weight of the internal queue 232 that is to be changed by the control unit 14 from the scheduling parameter 125.

Then, the scheduler 13 multiplies the weight of the internal queue 232 by the available transmission amount of the internal queue 232 in a single round. Then, the scheduler 13 sets the calculated value as a counter value in the counter area in the scheduler 13. Consequently, the scheduler 13 can set the counter value in accordance with the weight of the internal queues 232.

Then, the scheduler 13 extracts all of the internal queues 232 that are held by the transmission queue 23 and that give an instruction to output the packets.

Then, the scheduler 13 acquires the information on the packets stored in the extracted internal queues 232 and specifies the internal queues 232 that store therein the packets from among the extracted internal queues 232.

Furthermore, the scheduler 13 determines whether each of the counter values of the specified internal queues 232 is greater than zero. If there is the internal queue 232 with the counter value greater than zero, the scheduler 13 acquires the transmission request from the subject internal queue 232. Thereafter, the scheduler 13 selects the internal queue 232 that outputs the packets from among the internal queues 232 from which the transmission request is acquired.

Then, the scheduler 13 instructs the multiplexer 233 to output the packets from the selected internal queue 232. The multiplexer 233 acquires the packets from the internal queue 232 that is specified by the scheduler 13 and then outputs the packets to the transmission port 24.

Furthermore, the scheduler 13 acquires the transmission packet length. Then, the scheduler 13 subtracts the transmission packet length from the counter of the internal queue 232 that outputs the packets in the scheduling parameter 125.

Then, the scheduler 13 determines whether the internal queue 232 that has not been selected is present in the internal queues 232 included in the transmission queue 23. If the internal queue 232 that has not been selected is present, the scheduler 13 repeatedly performs the process of extracting the unselected internal queue 232, acquiring the transmission request, selecting the internal queue 232, outputting the packets, and subtracting the average packet length from the counter.

Furthermore, if the scheduler 13 selects all of the internal queues 232 included in the transmission queue 23, the scheduler 13 determines whether the counter of the internal queue 232 in which the packet remains is equal to or less than zero. If the counter from among the internal queues 232 in which the packet remains with the value greater than zero is present, the scheduler 13 deletes the selection history of the internal queues 232 and returns to the state in which the internal queue 232 is not selected. Thereafter, the scheduler 13 repeatedly performs the process of extracting the unselected internal queue 232, acquiring the transmission request, selecting the internal queue 232, outputting the packets, and subtracting the average packet length from the counter.

In contrast, if the counter value of the internal queue 232 in which the packet remains is equal to or less than zero, the scheduler 13 ends the process of outputting the packets. Thereafter, the scheduler 13 repeatedly performs the process described above starting from the setting of the counter.

In the following, a description will be given of selecting the internal queue 232 that outputs the packets from the internal queue 232 that acquires the transmission request due to the scheduler 13 according to the embodiment. Here, in the switch 1, restructure, such as dividing and combining the flow groups, is performed by the control unit 14. At this point, the scheduler 13 performs a first stage selection that selects, from the set of the restructuring internal queues 232, the internal queue 232 that outputs the packets. Furthermore, the scheduler 13 performs a second selection that selects, between the internal queue 232 selected at the first stage selection and the internal queues 232 that are not included in the first stage selection, the internal queue 232 that outputs the packets. In this way, the scheduler 13 performs the scheduling including selection having two stages. Thus, the scheduling including the selection having two stages will be described in detail. In a description below, because, in the first selection, selection is performed in accordance with the priority of the internal queue 232, the first stage selection is referred to as the "priority selection". Furthermore, because the second stage selection is the selection on the basis of the round robin, the second stage selection is referred to as the "round robin selection".

First, the scheduler 13 determines that the internal queue 232 that stores therein the packets and that has the counter value greater than zero as the internal queue 232 that stores therein the packets that can be sent. Then, the scheduler 13 acquires the transmission request from the internal queue 232 that can perform transmission.

For example, a description will be given of a case in which the four internal queues 232 are present in the transmission queue 23. In a description below, the numbers 0 to 3 are allocated to each of the internal queues 232 and the internal queues 232 are represented by internal queues #0 to #3, respectively. Then, the transmission request of the internal queue #0 is set to X[0], transmission request of the internal queue #1 is set to X[1], the transmission request of the internal queue #2 is set to X[2], and the transmission request of the internal queue #3 is set to X[3]. Furthermore, if the value of the transmission request is 1, this state indicates that the transmission request is present, whereas, if the value of the transmission request is 0, this state indicates that the transmission request is not present. Furthermore, in a description below, it is assumed that, if a description is simply represented by "X", this indicates a 4-bit signal in which the values of X[0] to X[3] are lined. This symbol X corresponds to the transmission request acquired by the scheduler 13 using the algorithm obtained by improving the above described DRR.

The scheduler 13 selects the internal queue 232 that is subsequently serviced after the input of this symbol X, i.e., the internal queue 232 that subsequently outputs the packets.

The response that indicates the internal queue 232 that outputs the packets from the scheduler 13 in response to the transmission request X is represented by Y. Furthermore, the parameter that represents, in 4-bit binary notation, the internal queue 232 that can be targeted for the priority selection in the first stage is represented by Z. For example, this can be represented by S=4'b0111. Here, it is assumed that W'bnnnn indicates that n is the binary number and indicates binary notation of W bits. Namely, S represents, at the portion of nnnn, the internal queues #0, 1, 2, and 3 in reverse order and the value associated with the internal queue 232 that possibly be targeted for the priority selection is 1. For example, if S=4'b0111, the internal queues #1 to #3 are the internal queues 232 that are targeted for the first stage selection. In a description below, the internal queue 232 that may possibly be targeted for the priority selection is referred to as a "first stage internal queue 232". Furthermore, the internal queues 232 other than the internal queue 232 that is a candidate for the priority selection is referred to as a "second stage internal queue 232".

The scheduler 13 acquires the information S that represents the first stage internal queue 232 from the control unit 14. The scheduler 13 returns the response of Y=(K&S)?SP (X1):K as a response Y that indicates the internal queue 232 that outputs the packet in response to the transmission request X. Here, X1=X&S is obtained. The symbol "&" represents the logical conjunction. Namely, the symbol X1 indicates the internal queue 232 that is the first stage internal queue 232 and that stores therein the packet that can be sent. For example, X1=0 indicates that the first stage internal queue 232 is not present. Furthermore, X2=X&NOT(S) is obtained. The symbol "NOT(S)" represents the inverse of S and is, for example, NOT(4'b0111)=4'b1000. Namely, the symbol X2 represents the second stage internal queue 232. If X2=0, only the first stage internal queue 232 is present. Furthermore, C=(X1)?SP(S):0 is obtained. Furthermore, (X1)?SP(S):0 represents the ternary operation and, if X1≠0, C=SP(S) is obtained and, if X1=0, C=0 is obtained. Furthermore, "|" represents the logical addition. Furthermore, K=RR(C|X2) is obtained. The symbols "SP" and "RR" will be described later. If the logical conjunction of K and S is not 0, the scheduler 13 returns Y=SP(X1) as a response and, if the logical conjunction of K and S is 0, the scheduler 13 returns Y=RR(C|X2).

Here, SP(X) is a function that selects the internal queue 232 with the highest priority from among X. For example, in a case of Y=SP(X), Y[0]=X[0], Y[1]=NOT(X[0])&X[1], Y[2]=NOT(X[0])&NOT(X[1])&X[2], and Y[3]=NOT(X [0])&NOT(X[1])&NOT(X[2])&X[3] are obtained. Here, Y[0] to [3] are responses to the internal queues #0 to #3, respectively, if the response is received from the scheduler 13. Namely, the scheduler 13 outputs the packets to the internal queue 232 with the value of 1 and does not output the packets to the internal queue 232 with the value of 0. In this case, the scheduler 13 selects the internal queues 232 in a descending order of the priority by using SP(X1) in which the priority of the internal queue #0 is set to the highest and the priority is decreased in the order of the internal queues #1, #2, and #3.

Furthermore, SP(S) indicates that the internal queue 232 with the highest priority is selected from among all of the first stage internal queues 232 as the target.

Furthermore, Y=RR(X) is the function indicated as follows. Namely, Y=C1|C2, C1=SP(X11), and C2= (SP(X11)==0)?SP(X22):0 are obtained. Here, "==" compares the left part with the right part and, if both are equal, 1 is set and, if both are not equal, 0 is set. Then, X11=X&R1 and R1=NEXT(R) are obtained. Here, R represents the immediately previous result by using 4'bnnnn and "NEXT" is the function illustrated in FIG. 11. FIG. 11 is a schematic diagram illustrating the function "NEXT". Furthermore, X22=X&R2 and R2=NOT(R1) are obtained. Namely, X11 represents R1 in which the transmission request is present. Furthermore, X22 represents R2 in which that transmission request is present.

Namely, the scheduler 13 performs dividing into group of the internal queues 232 with the number that is greater than that of the internal queues 232 that output the packets the last time from among the internal queues 232 and the group of the internal queues 232 with the number that is less than that of the internal queues 232 that output the packets the last time and then selects the internal queues 232 each having the highest priority. Then, the scheduler 13 selects the internal queues 232 in the group that does not include the internal queues 232 that output the packets the last time. Then, the scheduler 13 holds the result that is obtained from Y=RR(X) performed the last time as R and uses R when the selection is performed next time.

To summarize, the scheduler 13 selects, by using SP(X1) as the priority selection, the internal queues 232 with the high priority from among the first stage internal queues 232. Furthermore, the scheduler 13 performs the round robin selection, by using the function RR, between the internal queues 232 selected by the priority selection and the second stage internal queues 232. Then, if the selection result obtained when the selection up to the round robin selection is performed is the first stage internal queues 232, the scheduler 13 selects the internal queues 232 selected by the priority selection as the internal queues 232 that output the packets. In contrast, if the selection result obtained when the round robin selection is performed is not the first stage internal queues 232, the scheduler 13 selects the internal queues 232 selected by the round robin selection as the internal queues 232 that output the packets. Consequently, by using the round robin between the selected internal queues 232 and the second stage internal queues 232, the scheduler 13 selects the internal queues 232 with a high priority by using the priority selection and then selects the internal queues 232 that output the packets.

Here, the description above indicates the scheduling performed in a case in which the internal queue #0 is the highest priority and the priorities are decreased in the order #1 to #3. However, in practice, the priorities are not always equal to the order of queue number. Thus, the scheduler 13 performs recombination in accordance with the priority by using the following logic.

For example, if the transmission queue 23 has the four internal queues 232, the scheduler 13 performs recombination in accordance with the priority as Y=XCHG (X, P0, P1, P2, P3). Here, X represents a transmission request. Furthermore, P0 to 3 represents the value representing the priority of each of the internal queues #0 to #3 in 4-bit binary notation. This indicates that the priority is higher as the bit from among 4 bits closer to the right side. For example, if P0=4'b0010, P1=4'b0100, P2=4'b1000, and P3=4'b0001, this indicates that the priority of the internal queue #3 is the highest. Furthermore, in the following, Pn[k] represents the $k^{th}$ bit from the right of Pn.

Then, Y[0]=X[0]&P0[0]|X[1]&P0[1]|X[2]&P0[2]|X[3] &P0[3] is obtained. Furthermore, Y[1]=X[0]&P1[0]|X[1] &P1[1]|X[2]&P1[2]|X[3]&P1[3] is obtained. Furthermore, Y[2]=X[0]&P2[0]|X[1]&P2[1]|X[2]&P2[2]|X[3]&P2[3] is obtained. Furthermore, Y[3]=X[0]&P3[0]|X[1]&P3[1]|X[2] &P3[2]|X[3]&P3[3] is obtained.

Namely, the scheduler 13 interchanges the order of bits in line with the priority in the function described above such that the transmission requests are arranged in the order the internal queues 232 with high priority starting from the left side of 4 bits. Then, by using the transmission requests in which the order of bits are interchanged, the scheduler 13 selects the internal queues 232 that are used to output the packets. Thereafter, the scheduler 13 interchanges the order of bits to the original state by using the function described above. Then, the scheduler 13 allows the multiplexer 233 to select the internal queues 232 by using the state in which the order of bits is interchanged to the original state.

Figure 12:
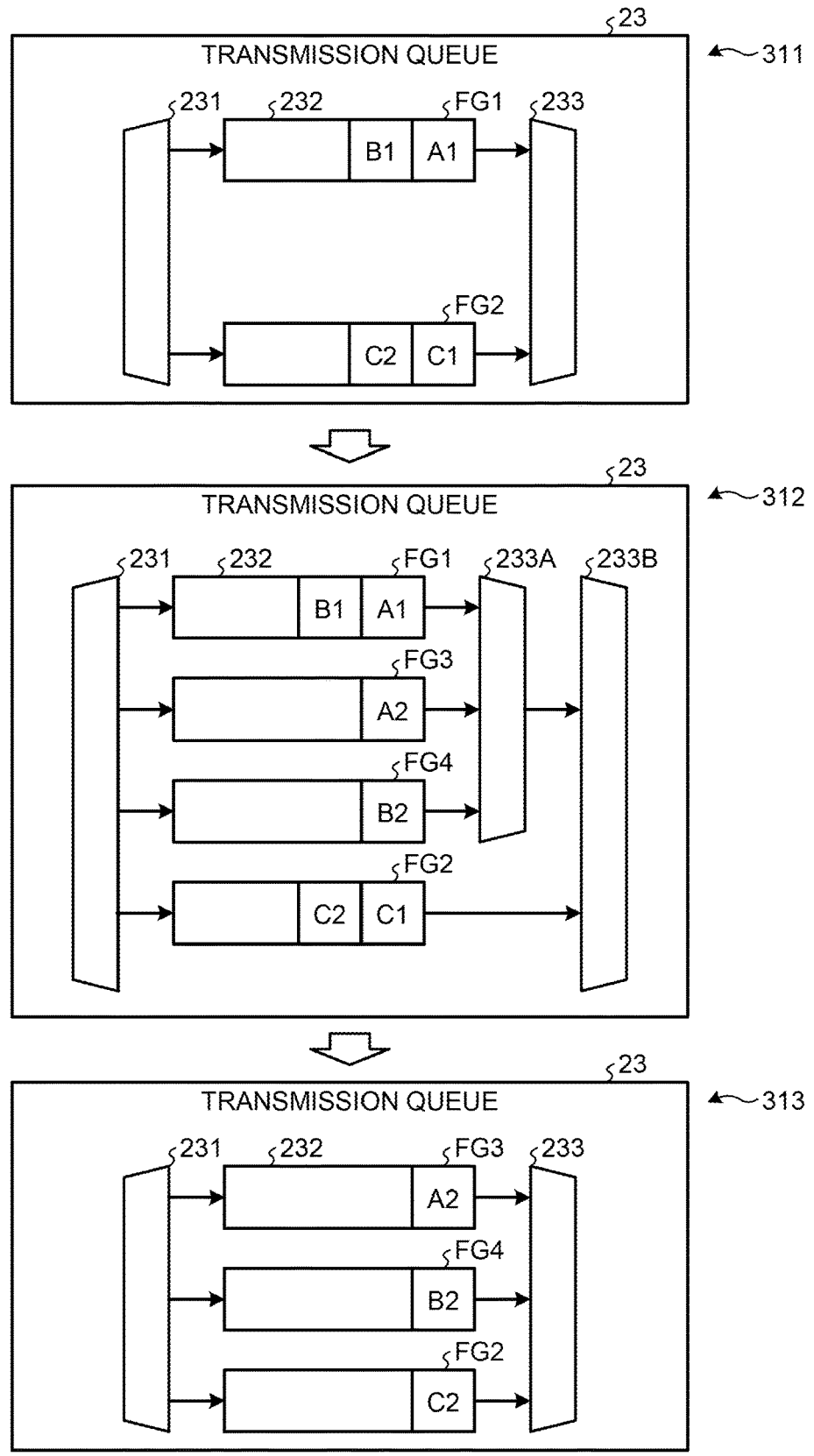
FIG. 12 is a schematic diagram illustrating an output of packets when flow groups in a switch according to a second embodiment are divided.

In the following, an output of the packets performed when the flow groups in the switch according to the embodiment are divided will be described with reference to FIG. 12. FIG. 12 is a schematic diagram illustrating an output of packets when the flow groups in a switch according to a second embodiment are divided. A state 311 illustrated in FIG. 12 represents the state before division. A state 312 represents the state in which the division is being performed. A state 313 represents the state after the division.

Because the state 311 is before the division, the scheduler 13 does not perform the priority selection but performs only the round robin selection. In the state 311, a flow A and a flow B belong to the flow group FG1. Then, the internal queue 232 that is allocated to the flow group FG1 stores therein the packet A1 included in the flow A and the packet B1 included in the flow B. Furthermore, the flow C belongs to the flow group FG2. Furthermore, the internal queue 232 allocated to the flow group FG2 stores therein the packets C1 and C2 included in the flow C.

In the state represented by the state 311, the control unit 14 starts to divide the flow group FG1. In this case, the control unit 14 newly creates the flow group FG3 to which the flow A belongs and newly creates the flow group FG4 to which the flow B belongs. Then, the transmission queue 23 shifts the state 311 to the state 312. In the state 312, a multiplexer 233A performs the priority selection and a multiplexer 233B performs the round robin selection. The flow group FG3 stores therein the newly input packet A2 included in the flow A. Furthermore, the flow group FG4 stores therein the newly input packet B2 included in the flow B. The control unit 14 sets the priority of the flow group FG1 before division to the priority higher than that of the flow groups FG3 and FG4 after division.

The scheduler 13 allows the multiplexer 233A to select the internal queue 232 that is allocated to the flow group with the highest priority from among the flow groups FG1, FG3, and FG4. In this case, because the priority of the internal queue 232 allocated to the flow group FG1 is the highest, the multiplexer 233A selects the internal queue 232 allocated to the flow group FG1 until no packet is present in the flow group FG1. Consequently, the order of the packets that are output from the transmission queue 23 is maintained in the order the packets are input. Furthermore, the scheduler 13 allows the multiplexer 233B to select the internal queue 232, by using the round robin selection, from among the internal queues 232 selected by the multiplexer 233A and the internal queues 232 allocated to the flow group FG2. Then, the multiplexer 233B acquires the packets from the selected internal queues 232 and outputs the packets to the transmission port 24. For example, if the round robin selection is performed starting from the internal queue 232 that has been selected by the multiplexer 233A, the multiplexer 233B outputs the packets in the order of the packets A1, C1, and B1.

If the packets A1 and B1 are output and no packet is present in the flow group FG1, the control unit 14 deletes the flow group FG1 and sets the internal queues 232 that were allocated to the flow group FG1 to an unused state. Consequently, the transmission queue 23 shifts the state 312 to the state 313. Because dividing the flow groups has been ended, the scheduler 13 allows the multiplexer 233 to perform only the round robin selection in the flow groups FG2 to FG4.

In this way, by performing the scheduling using the priority selection and the round robin selection in combination, the scheduler 13 can implement dividing the flow groups without inverting the order of packets and can maintain the fairness of packet transmission.

Figure 13:
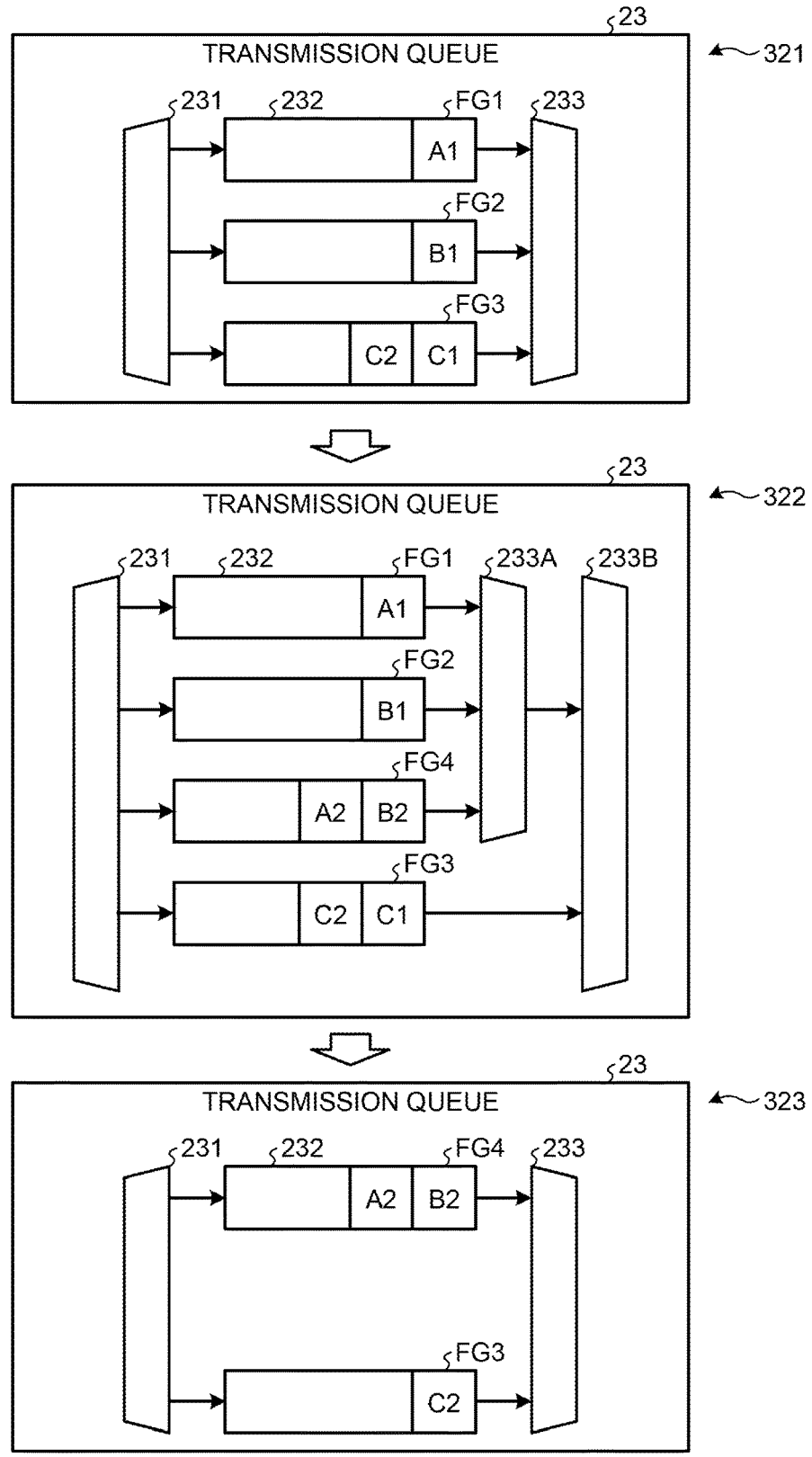
FIG. 13 is a schematic diagram illustrating an output of the packets when the flow groups in the switch according to the second embodiment are combined.

In the following, an output of the packets performed when the flow groups in the switch 1 according to the embodiment are combined will be described with reference to FIG. 13. FIG. 13 is a schematic diagram illustrating an output of packets when the flow groups in the switch according to the second embodiment are combined. A state 321 illustrated in FIG. 13 represents the state before combination. A state 322 represents the state in which the combination is being performed. A state 323 represents the state after the combination.

Because the state 321 is before the combination, the scheduler 13 does not perform the priority selection but performs only the round robin selection. In the state 321, the flow A belongs to the flow group FG1, the flow B belongs to the flow group FG2, and the flow C belongs to the flow group FG3. Then, the internal queue 232 allocated to the flow group FG1 stores therein the packet A1 included in the flow A. The internal queue 232 allocated to the flow group FG2 stores therein the packet B1 included in the flow B. Furthermore, the internal queue 232 allocated to the flow group FG3 stores therein the packets C1 and C2 included in the flow C.

In the state represented by the state 321, the control unit 14 starts to combine the flow groups FG1 and FG2. In this case, the control unit 14 newly creates the flow group FG4 to which the flows A and B belong. Then, the transmission queue 23 shifts the state 321 to the state 322. In the state 322, the multiplexer 233A performs the priority selection and a multiplexer 223B performs the round robin selection. The flow group FG4 stores the newly input packet A2 included in the flow A and the packet B2 included in the flow B. The control unit 14 sets the priority of the flow groups FG1 and FG2 before the combination to higher than that of the flow group FG4 after the combination.

The scheduler 13 allows the multiplexer 233A to select the internal queue 232 allocated to the flow group with the highest priority from among the flow groups FG1, FG2, and FG4. In this case, because the priority of the internal queues 232 allocated to the flow groups FG1 and FG2 is high, the multiplexer 233A sequentially selects, until no packets is present in the flow groups FG1 and FG2, the internal queues 232 that are allocated to the flow groups FG1 and FG2. Consequently, the order of the packets that are output from the transmission queue 23 is maintained in the order in which the packets that are input. Furthermore, the scheduler 13 allows the multiplexer 233B to select the internal queues 232, by using the round robin selection, from among the internal queues 232 selected by the multiplexer 233A and the internal queues 232 allocated to the flow group FG3. Then, the multiplexer 233B acquires the packets from the selected internal queue 232 and outputs the acquired packets to the transmission port 24. For example, if the round robin selection is started from selecting the internal queues 232 that are selected by the multiplexer 233A, the multiplexer 233B outputs the packets in the order of the packets A1, C1, and B1.

If the packets A1 and B1 are output and if no packet is present in the flow groups FG1 and FG2, the control unit 14 deletes the flow groups FG1 and FG2 and sets the internal queues 232 that were allocated to the flow groups FG1 and FG2 to an unused state. Consequently, the transmission queue 23 shifts the state 322 to the state 323. Because the combination of the flow groups has been ended, the scheduler 13 allows the multiplexer 233 to perform only the round robin selection in the flow groups FG3 and FG4.

In this way, by performing the scheduling using the priority selection and the round robin selection, the scheduler 13 can implement combination of the flow groups without inverting the order of packets and can maintain the fairness of packet transmission.

Figure 14:
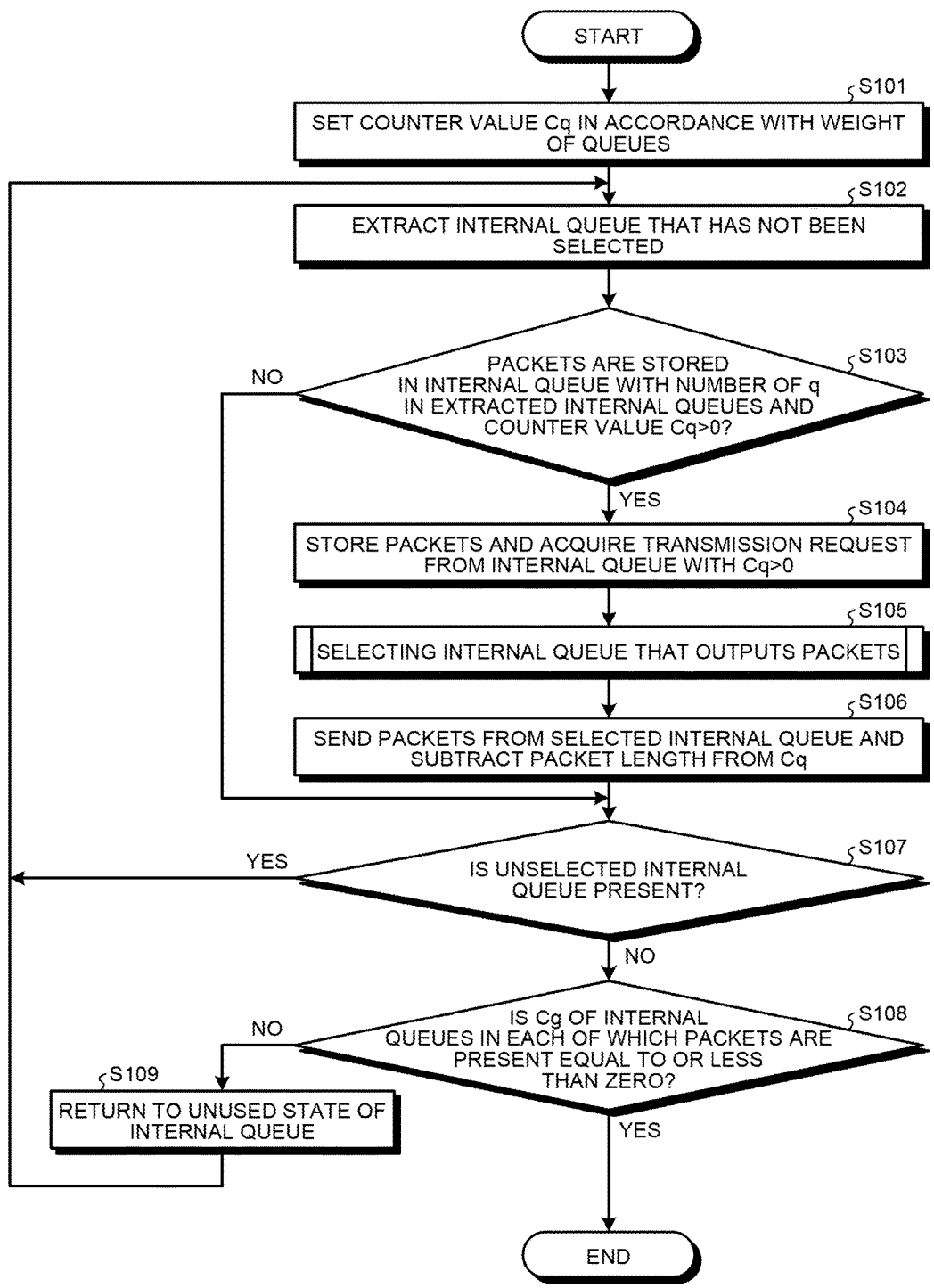
FIG. 14 is a flowchart illustrating the flow of deciding an internal queue that acquires a transmission request from a scheduler according to the second embodiment.

In the following, the flow of deciding the internal queues 232 that acquires a transmission request from the scheduler 13 according to the embodiment will be described with reference to FIG. 14. FIG. 14 is a flowchart illustrating the flow of deciding an internal queue that acquires a transmission request from a scheduler according to the second embodiment.

The scheduler 13 acquires the available transmission amount of each of the internal queues 232 in one round from the control information sending/receiving unit 11. Furthermore, the scheduler 13 acquires the weight of the internal queue 232 that is changed by the control unit 14 from the scheduling parameter 125. Then, the scheduler 13 multiplies the weight of the internal queue 232 by the available transmission amount of the internal queue 232 in one round. Then, by setting the calculated value, as the counter value, in the counter area in the scheduler 13, the scheduler 13 sets, in accordance with the weight of the queues, the counter value in each of the internal queues 232 (Step S101). In the following, consecutive numbers are allocated to the internal queues 232 included in the transmission queue 23 targeted for the scheduling, the number is represented by q. Furthermore, the counter value that is set to the internal queue 232 with the number of q is represented by Cq.

Then, the scheduler 13 extracts the internal queue 232 that has not been selected from among the internal queues 232 included in the transmission queue 23 that instructs to output the packets (Step S102).

Then, the scheduler 13 determines whether the packets are stored in the internal queue 232 with the number of q in the extracted internal queues 232 and the counter value Cq is greater than zero (Step S103). If no packet is stored in all of the internal queues 232 with the number of q or if all of the counter values satisfy Cq≤0 (No at Step S103), the scheduler 13 proceeds to Step S107.

In contrast, if a packet is stored in the internal queue 232 with the number of q and if the counter value Cq is greater than zero (Yes at Step S103), the scheduler 13 stores the packet and acquires the transmission request from the internal queue 232 with the counter value Cq that is greater than zero (Step S104).

Then, the scheduler 13 selects the internal queue 232 that outputs the packets from among the internal queues 232 that acquire the transmission requests (Step S105).

Then, The scheduler 13 instructs the multiplexer 233 to output the packets from the selected internal queue 232. The multiplexer 233 acquires the packets from the internal queue 232 instructed by the scheduler 13 and outputs the packets to the transmission port 24. Furthermore, the scheduler 13 acquires the average packet length from the scheduling parameter 125. Then, the scheduler 13 subtracts the average packet length from the counter value that is stored in the scheduling parameter 125 and that is related to the internal queues 232 that have output the packets (Step S106).

Then, the scheduler 13 determines whether the internal queue 232 that has not been selected is present in the internal queue 232 included in the transmission queue 23 (Step S107). If the internal queue 232 that has not been selected is present (Yes at Step S107), the scheduler 13 returns to Step S102.

In contrast, if selecting all of the internal queues 232 included in the transmission queue 23 has been ended (No at Step S107), the scheduler 13 determines whether all of the counter values of the internal queues 232 in each of which the packet is present is equal to or less than zero (Step S108). If all of the counter values of the internal queues 232 in each of which the packets are present are greater than zero (No at Step S108), the scheduler 13 returns to an unused state of the internal queue 232 (Step S109). Thereafter, the scheduler 13 returns to Step S102.

In contrast, if all of the counter values of the internal queues 232 in each of which the packets are present are equal to or less than 0 (Yes at Step S108), the scheduler 13 ends the process of outputting the packets.

In the following, the determination procedure of the internal queue 232 that outputs the packet from the scheduler 13 according to the embodiment will be described with reference to FIG. 15. FIG. 15 is a flowchart illustrating the flow of determining an internal queue that outputs a packet performed by the scheduler according to the second embodiment. Here, the flow illustrated in FIG. 15 corresponds to the process performed at Step S105 illustrated in FIG. 14.

The scheduler 13 receives, from the control unit 14, an input of the information S indicating the first stage internal queue 232 (Step S201).

Then, the scheduler 13 recombines the order of the transmission requests, by using the XCHG function described above, in line with the priority (Step S202).

Then, the scheduler 13 determines whether the first stage internal queue 232 is present (Step S203). If the first stage internal queue 232 is not present (No at Step S203), the scheduler 13 performs the round robin selection on the second stage internal queue 232 (Step S205). Then, the scheduler 13 proceeds to Step S209.

In contrast, if the first stage internal queue 232 is present (Yes at Step S203), the scheduler 13 performs the priority selection on the first stage internal queue 232 (Step S204).

Then, the scheduler 13 determines whether the second stage internal queue 232 is present (Step S206). If the second stage internal queue 232 is not present (No at Step S206), the scheduler 13 selects the internal queue 232 selected at the priority selection (Step S207). Then, the scheduler 13 proceeds to Step S209.

In contrast, if the second stage internal queue 232 is present (Yes at Step S206), the scheduler 13 performs the round robin selection on the internal queue 232 selected at the priority selection and the second stage internal queue 232 (Step S208).

Thereafter, the scheduler 13 returns the order of the transmission requests that are recombined on the basis of the priority using the XCHG function described above to the original order (Step S209).

Then, the scheduler 13 allows the multiplexer 233 to send the packet from the selected internal queue 232 (Step S210).

As described above, the scheduler according to the embodiment decides the internal queue that acquires the transmission request by using the algorithm in which DRR is improved. Thereafter, the scheduler decides the internal queue that outputs the packets by using the priority selection and the round robin selection from among the internal queues that have output the transmission requests. Consequently, because the internal queues that output the packets are sequentially changed, it is possible to suppress the state of continuously outputting the packets from a single internal queue and it is possible to reduce the load applied to the reception side apparatus that corresponds to the input destination of the packets from the Switch.

Then, by reducing the load applied to the reception side apparatus, it is possible to contribute a reduction in the problem, such as preventing the buffer resources on the reception side apparatus from being exhausted or a lack of switching or reception performance in the receiving apparatus.

Furthermore, in a description above, the algorithm obtained by improving DRR is used to determine the internal queue that acquires the transmission request; however, for example, the conventionally used WRR, DRR, or the like may also be used to acquire the transmission request as long as an increase in the load applied on the reception side is allowed to some extent. In such a case, by using the priority selection and the round robin selection described in the embodiment with respect to the internal queues that acquire the transmission requests decided by using the algorithm, such as WRR, DRR, or the like, the scheduler can reduce the load applied to the reception side apparatus to some extent.

According to an aspect of an embodiment of the switching device and the control method of the switching device disclosed in the present invention, an advantage is provided in that it is possible to improve the communication performance.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching device comprising:
   a processor configured to:
   receive and store packets;
   output each of the stored packets;
   acquire transmission/reception information on the packets stored in each of the queues;
   create, based on the transmission/reception information acquired, a plurality of flow groups to each of which one or a plurality of flows belongs and allocate the queues to each of the flow groups; and
   determine, based on the transmission/reception information acquired and based on previously determined priority of the queues, the order in which each of the queues is output,
   the creating includes dividing, when a difference between the transmission amount of the packet for each flow that belongs to a specific flow group and previously determined band width is increased, the specific flow group and allocating the queues to the divided flow groups,
   when a throughput of each of the flows belonging to the flow group is decreased, the switching device divides the flow group and outputs the packets from each of internal queues, so that the flows with decreased throughput are stored in a plurality of internal queues and a possibility that the flows are output is increased.

2. The switching device according to claim 1, wherein
   the creating includes creating the plurality of divided flow groups from the specific flow group and allocating the queues to the created and divided flow groups, and
   the determining includes determining the output order such that, after all of the packets that are stored in a first queue allocated to the certain flow group have been output, the packets are output from a second queue allocated to each of the divided flow groups.

3. The switching device according to claim 2, wherein the determining includes selecting the queues in accordance with the priority order that is previously determined from the first queue and the second queue and determining to output the packets from the queues that are selected by round robin from among both the selected queues and the queues other than the first queue and the second queue.

4. The switching device according to claim 1, wherein
   the processor is further configured to calculate, based on the transmission/reception information, the weight for each queue,
   the determining includes counting a remaining amount for each queue, sets a value of the remaining amount counter in accordance with the weight of the queues calculated, sends the packets for each of the queues, subtracts the packet size of each of the sent packets from the remaining amount counter that is associated with the queue that sent the packet, stops to send the packet from the queue in which the remaining amount counter is equal to or less than zero, and outputting the packet from the queue, in which an output is not stopped, until the remaining amount counter of all of the queues becomes zero.

5. The switching device according to claim 1, when the number of queues to be allocated to each of the flow groups exceeds to a predetermined number when division is performed, the creating includes selecting the flow groups with a small transmission amount of the packets and combining the flow groups.

6. A control method of a switching device, the control method comprising:
   receiving and storing therein packets and acquiring transmission/reception information on the packets in a plurality of queues that outputs each of the stored packets;
   creating, based on the acquired transmission/reception information, a plurality of flow groups to each of which one or a plurality of flows belongs;
   allocating the queues to each of the created flow groups;
   determining, based on the transmission/reception information and based on previously determined priority of the queues, the order in which each of the queues is output,
   the creating includes dividing, when a difference between the transmission amount of the packet for each flow that belongs to a specific flow group and previously determined band width is increased, the specific flow group and allocating the queues to the divided flow groups,
   when a throughput of each of the flows belonging to the flow group is decreased, the switching device divides the flow group and outputs the packets from each of internal queues, so that the flows with decreased throughput are stored in a plurality of internal queues and a possibility that the flows are output is increased.

* * * * *